(12) United States Patent
Fuse et al.

(10) Patent No.: US 7,783,857 B2
(45) Date of Patent: Aug. 24, 2010

(54) DATA MANAGEMENT APPARATUS AND METHOD, NON-VOLATILE MEMORY, STORAGE DEVICE HAVING THE NON-VOLATILE MEMORY AND DATA PROCESSING SYSTEM

(75) Inventors: Hiroaki Fuse, Tokyo (JP); Akira Sassa, Saitama (JP); Atsushi Onoe, Kanagawa (JP)

(73) Assignee: Sony Corporation, Tokyo (JP)

( * ) Notice: Subject to any disclaimer, the term of this patent is extended or adjusted under 35 U.S.C. 154(b) by 316 days.

(21) Appl. No.: 10/960,096

(22) Filed: Oct. 8, 2004

(65) Prior Publication Data
US 2005/0144366 A1 Jun. 30, 2005

(30) Foreign Application Priority Data
Oct. 14, 2003 (JP) .................... P2003-354281

(51) Int. Cl.
G06F 12/02 (2006.01)
(52) U.S. Cl. ................. 711/203; 711/210; 711/E12.066
(58) Field of Classification Search .................. 711/200, 711/203, 210
See application file for complete search history.

(56) References Cited

U.S. PATENT DOCUMENTS 5,384,666 A * 1/1995 Kanota et al. .................. 360/32
6,098,077 A * 8/2000 Sassa .......................... 707/202

FOREIGN PATENT DOCUMENTS

| EP | 0 887 732 A1 | 12/1998 |
| EP | 0 887735 A2 | 12/1998 |
| JP | H8-227372 | 9/1996 |

OTHER PUBLICATIONS

EPO Search Report mailed Mar. 1, 2005.

* cited by examiner

*Primary Examiner*—Reginald G Bragdon
*Assistant Examiner*—Kenneth M Lo
(74) *Attorney, Agent, or Firm*—Rader, Fishman & Grauer PLLC

(57) ABSTRACT

In a data management method for supervising a non-volatile memory having a plurality of blocks erasable in a lump, each of the blocks being formed by a plurality of pages, each of the pages including a redundant area, the aggregate management information is used for data management to enable prompt booting. The distributed management information, as the management information for the respective blocks, is stored in the redundant area of each page, and the aggregate management information supervises data stored in each block, in a lump, in association with the distributed management information. It is verified, at the time of booting, whether the aggregate management information is effective. The data is supervised based on the aggregate management information when the aggregate management information is effective and, when the aggregate management information is not effective, the data is supervised based on the distributed management information.

22 Claims, 18 Drawing Sheets

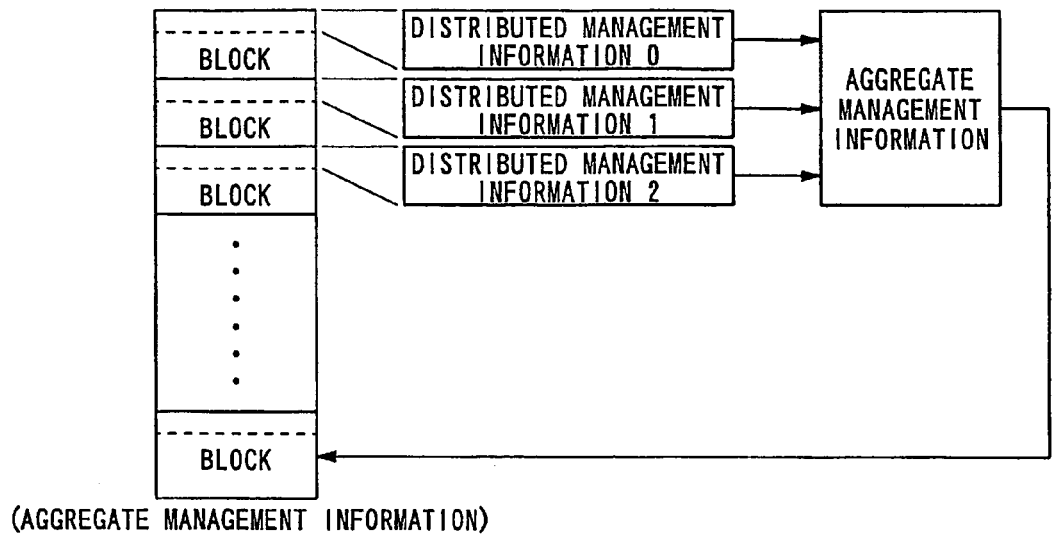
(AGGREGATE MANAGEMENT INFORMATION)
FIG. 7
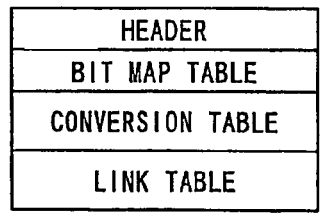
FIG. 8
| | 1-ENTRY 2 BYTES |
|---|---|
| LOGICAL ADDRESS 0 | PHYSICAL ADDRESS |
| LOGICAL ADDRESS 1 | PHYSICAL ADDRESS |
| LOGICAL ADDRESS 2 | PHYSICAL ADDRESS |
| ⋮ | ⋮ |
FIG. 9

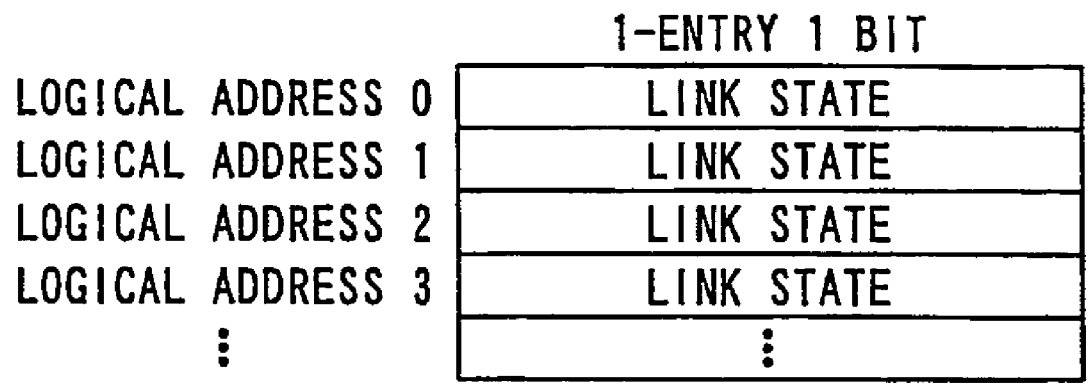
FIG.18
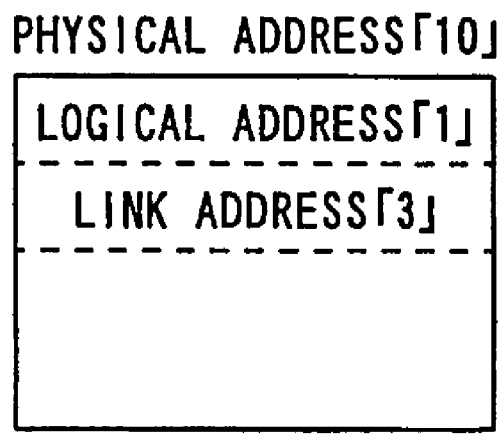 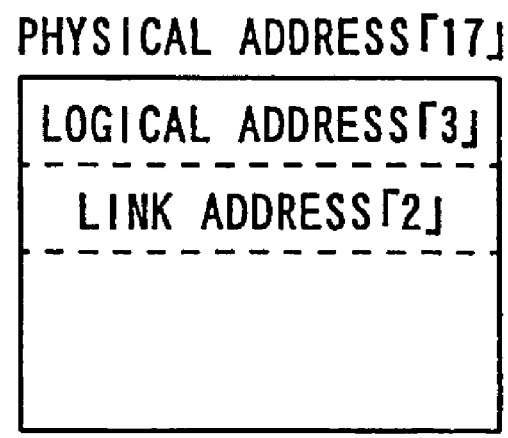
FIG.19

| | ERROR DETECTION TABLE | CONVERSION TABLE | LINK TABLE |
|---|---|---|---|
| LOGICAL ADDRESS 1 | 0 | 0xffff | |
| LOGICAL ADDRESS 2 | 0 | 0xffff | |
| LOGICAL ADDRESS 3 | 0 | 0xffff | |

FIG. 20A

| | ERROR DETECTION TABLE | CONVERSION TABLE | LINK TABLE |
|---|---|---|---|
| LOGICAL ADDRESS 1 | 0 | 10 | 3 |
| LOGICAL ADDRESS 2 | 0 | 0xffff | |
| LOGICAL ADDRESS 3 | 0 | 0xffff | |

FIG. 20B

| | ERROR DETECTION TABLE | CONVERSION TABLE | LINK TABLE |
|---|---|---|---|
| LOGICAL ADDRESS 1 | 0 | 10 | 3 |
| LOGICAL ADDRESS 2 | 0 | 0xffff | |
| LOGICAL ADDRESS 3 | 1 | 1 | |

FIG. 20C

| | ERROR DETECTION TABLE | CONVERSION TABLE | LINK TABLE |
|---|---|---|---|
| LOGICAL ADDRESS 1 | 0 | 10 | 3 |
| LOGICAL ADDRESS 2 | 0 | 0xffff | 2 |
| LOGICAL ADDRESS 3 | 0 | 17 | |

FIG. 20D

| | ERROR DETECTION TABLE | CONVERSION TABLE | LINK TABLE |
|---|---|---|---|
| LOGICAL ADDRESS 1 | 0 | 10 | 3 |
| LOGICAL ADDRESS 2 | 1 | 3 | 2 |
| LOGICAL ADDRESS 3 | 0 | 17 | |

FIG. 20E

DATA MANAGEMENT APPARATUS AND METHOD, NON-VOLATILE MEMORY, STORAGE DEVICE HAVING THE NON-VOLATILE MEMORY AND DATA PROCESSING SYSTEM

BACKGROUND OF THE INVENTION

1. Field of the Invention

This invention relates to a method and an apparatus for supervising data of a non-volatile memory, the storage area of which is divided into a plurality of blocks, the non-volatile memory, a storage device having the non-volatile memory, and a data processing system.

This application claims priority of Japanese Patent Application No. 2003-354281, filed on Oct. 14, 2003, the entirety of which is incorporated by reference herein.

2. Description of Related Art

As typical of an external storage device used in a data processing apparatus, such as a personal computer or a digital still camera, there is an external storage device provided with a flash memory.

With the external storage device, provided with the flash memory, the storage area is divided into plural blocks, and the data area is supervised on the block basis. Each block is the unit of data erasure. That is, in erasing data, the block including the data in its entirety is initialized, so that the data stored in the block is erased in a lump.

If, in such external storage device, the data is stored in a block, a unique logical address is accorded to each such block, which is supervised using this logical block.

The data stored in the external storage device is usually stored on the file basis in the external storage device. If a sole file is stored across plural blocks, the link information for these blocks is needed. Thus, if the sole file is stored in the plural blocks, the logical address of the next block, termed the link address, is stored in each of the blocks, having the file stored therein.

Up to now, in this sort of the external storage device, the processing for inspecting whether or not there is any error in the storage area or the processing for concealing errors that have occurred is carried out each time the external storage device is booted. In the following explanation, this processing is termed the error detection and correction processing. Usually, the error detection and correction processing is the time-consuming processing involving a relatively large load. Hence, the conventional external storage device suffers from a drawback that it cannot be booted quickly by reason of the error detection and correction processing.

It is supposed that, in the external storage device, in which the data area is supervised on the block basis, the data is newly written, or the data stored in the block is updated, and that, in such case, the power supply is suddenly interrupted or the external storage device is forcibly dismounted from the data processing device. In this case, such states may arise in which plural blocks having the same logical address may coexist or in which there is no block indicated by the link address. These states are referred to below as the state of the logical address error or the state of the link address error, respectively. In such case, the external storage device cannot be used as regularly, with the file being incidentally linked to an unexpected block.

However, the conventional external storage device does not have the function of detecting logical errors or link errors to conceal the errors properly. The result is that, if the power supply is suddenly interrupted or the external storage device is forcibly dismounted from the data processing device, the external storage device is no longer usable regularly as from such time.

[patent publication 1]

Japanese Laid-Open Patent Publication H8-227372

SUMMARY OF THE INVENTION

In view of the above depicted status of the art, it is an object of the present invention to provide a method and an apparatus for supervising data of a non-volatile memory, the storage area of which is divided into a plurality of blocks, the non-volatile memory, and a storage device having the non-volatile memory, and a data processing system, in which prompt booting is rendered possible by supervising data using the aggregate management information.

In one aspect, the present invention provides a data management apparatus for supervising a non-volatile memory having a plurality of blocks erasable in a lump, each of the blocks being formed by a plurality of pages, each of the pages including a redundant area, in which the apparatus comprises management means for storing the distributed management information, as the management information for the respective blocks, in the redundant area of each page, and for storing the aggregate management information in the non-volatile memory, in association with the distributed management information. The aggregate management information supervises data stored in the non-volatile memory in a lump. The management means verifies, at the time of booting, whether the aggregate management information is effective. The management means supervises the data based on the aggregate management information when the aggregate management information is effective, while the management means supervises the data based and on the distributed management information when the aggregate management information is not effective.

In another aspect, the present invention provides a data management method for supervising a non-volatile memory having a plurality of blocks erasable in a lump, each of the blocks being formed by a plurality of pages, each of the pages including a redundant area, in which the method includes storing the distributed management information, as the management information for the respective blocks, in the redundant area of each page, and storing the aggregate management information in the non-volatile memory, in association with the distributed management information. The aggregate management information supervises data stored in the non-volatile memory in a lump. The method also includes verifying, at the time of booting, whether the aggregate management information is effective, supervising the data based on the aggregate management information when the aggregate management information is effective, and supervising the data based on the distributed management information when the aggregate management information is not effective.

In a further aspect, the present invention provides a non-volatile memory having a plurality of blocks erasable in a lump, each of the blocks being formed by a plurality of pages, each of the pages including a redundant area, wherein the distributed management information, as the management information for the respective blocks, is stored in the redundant area of each page, the aggregate management information, supervising data stored in each block in a lump, is stored in association with the distributed management information, and it is verified, at the time of booting, whether the aggregate management information is effective, the data is supervised based on the aggregate management information when the aggregate management information is effective, and wherein the data is supervised based on the distributed management information when the aggregate management information is not effective.

In a further aspect, the present invention provides a storage device including a non-volatile memory having a plurality of blocks erasable in a lump, each of the blocks being formed by a plurality of pages: each of the pages including a redundant area, wherein the distributed management information, as the management information for the respective blocks, is stored in the redundant area of each page, the aggregate management information supervises data stored in each block, in a lump, in association with the distributed management information, and it is verified, at the time of booting, whether the aggregate management information is effective, the data is supervised based on the aggregate management information when the aggregate management information is effective, and wherein the data is supervised based on the distributed management information when the aggregate management information is not effective.

In yet another aspect, the present invention provides a data processing system comprising an external storage device including a non-volatile memory having a plurality of blocks erasable in a lump, each of the blocks being formed by a plurality of pages, each including a redundant area, and a data management device for supervising the external storage device, wherein the data management device includes management means for storing the distributed management information, as the management information for the respective blocks, in the redundant area of each page, and for storing the aggregate management information in the non-volatile memory, in association with the distributed management information. The aggregate management information supervises data stored in the non-volatile memory in a lump The management means verifies, at the time of booting, whether the aggregate management information is effective. The management means supervises the data based on the aggregate management information when the aggregate management information is effective, and supervises the data based on the distributed management information when the aggregate management information is not effective.

According to the present invention, described above, the distributed management information, as the management information for the respective blocks, is stored in the redundant area of each page, the aggregate management information supervising data stored in each block, in a lump, in association with the distributed management information, is stored in a non-volatile memory, and it is verified, at the time of booting, whether the aggregate management information is effective, the data is supervised based on the aggregate management information when the aggregate management information is effective, and the data is supervised based on the distributed management information when the aggregate management information is not effective. That is, the aggregate management information is effective in most cases, and may be used for booting, thereby enabling prompt booting of the storage device.

BRIEF DESCRIPTION OF THE DRAWINGS

FIG. 7 shows the manner of constructing the aggregate management information from the distributed management information of each block.

FIG. 8 shows the configuration of the aggregate management information.

FIG. 9 shows a conversion table.

FIG. 18 shows an error detection table.

FIG. 19 shows a concrete example of block-to-block coupling states.

FIGS. 20A to 20E show the processing flow in case the of block-to-block coupling states are as shown in FIG. 19, as an example of coupling address enor detection.

DESCRIPTION OF THE PREFERRED EMBODIMENTS

Figure 1:
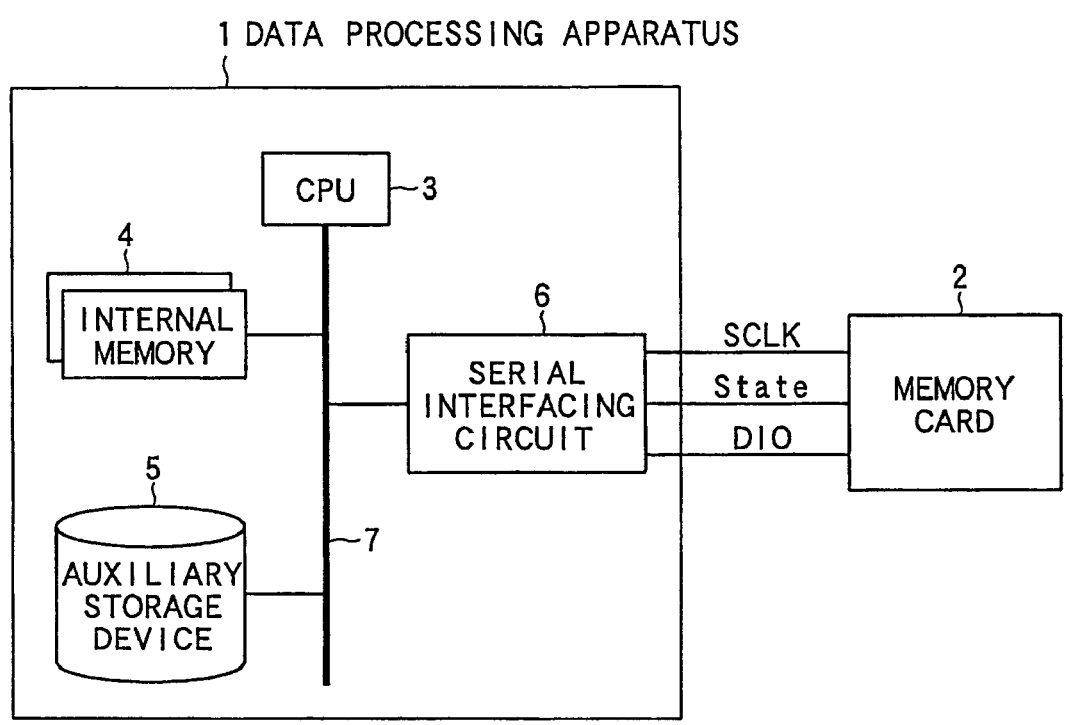
FIG. 1 shows the overall configuration of a system embodying the present invention.

Referring now to the drawings, certain preferred embodiments of the present Invention are explained in detail.

1. Overall System Configuration

FIG. 1 shows the overall configuration of a system according to an embodiment of the present invention, This system is made up by a data processing apparatus 1, as a host side system, and a memory card 2, as an external storage device, connected to the data processing apparatus 1 over a serial interface. The data processing apparatus 1 includes a central processing unit (CPU) 3, an internal memory 4, an auxiliary storage device 5, and a serial interfacing circuit 6, interconnected over a bus 7. The data processing apparatus 1 reads out a program, stored in e.g. the auxiliary storage device 5, to execute the program by the CPU 3, using the internal memory 4 as a work area. At this time, data is exchanged with the memory card 2 over the serial interfacing circuit 6.

There is no limitation to the data processing apparatus 1, used in the system of the present invention. That is, the present invention may be applied to a wide variety of data processing apparatus, such as a personal computer, a digital still camera or a digital video camera.

The data processing apparatus 1 and the memory card 2 are interconnected over a serial interface, specifically, by at least three data lines SCLK, State and DIO. That is, the data processing apparatus 1 and the memory card 2 are interconnected at least via a first data line SCLK, transmitting clock signals in data transmission, a second data line State, transmitting status signals in data transmission, and a third data line 910, serially transmitting dztz written ir, the memory cud 2 or dab read out from the memory card 2, and data exchange is carried out over these lines between the data processing apparatus 1 and the memory card 2.

The data exchange between the data processing apparatus 1 and the memory card 2 is usually carried out in terms of a file, made up by a header and real data, as a unit. In the file header are stored e.g. the information necessary in accessing a file and the information needed in the program executed in the data processing apparatus 1.

2. Structure of Memory Card

Figure 2:
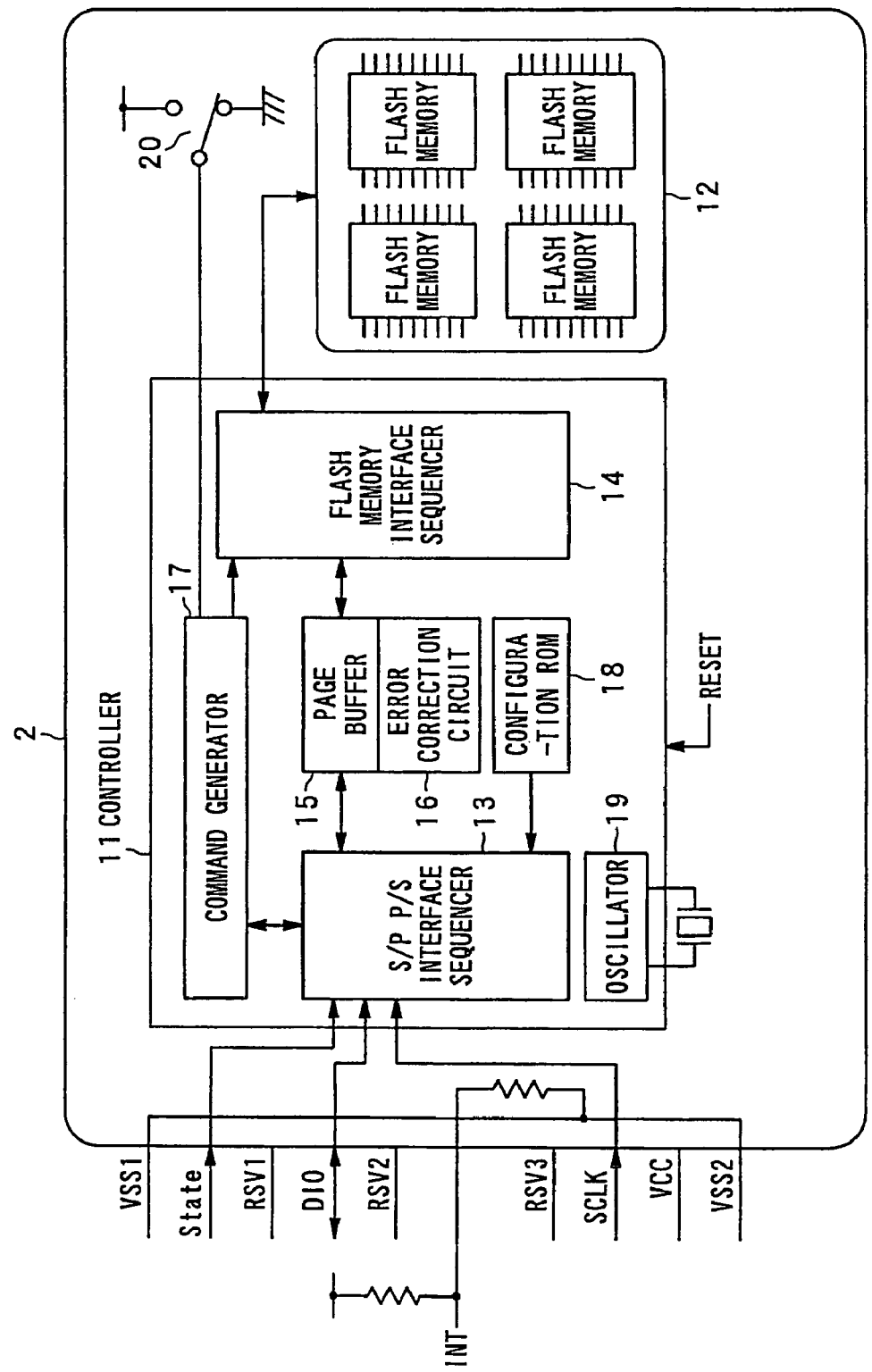
FIG. 2 is 2 block diagram showing the configuration of a memory card embodying the present invention.

Referring to FIG. 2, the memory card 2 is made up by a controller 11, comprised of a so-called control IC, and a flash memory 12, supervised by the controller 11.

The controller 11 includes a serial/parallel parallel/serial interface sequencer 13, referred to below as an SP P/S interface sequencer 13, for Serial/parallel parallel/serial conversion, a flash memory interface sequencer 14, taking charge of interfacing to the flash memory 12, a page buffer 15 for transient storage of data exchanged between the SP P/S interface sequencer 13 and the flash memory interface sequencer 14, an error correction circuit 16 for error correction, and a command generator 17 for generating e.g. a control command for controlling the access to the flash memory 12. The controller 11 also includes a configuration ROM 18 having stored therein e.g. the version information of the memory card 2 or a variety of the attribute information, and an oscillator 19 for supplying clock signals as needed for the operation of the respective circuits.

The S/P P/S interface sequencer 13 is connected to the serial interfacing circuit 6 of the data processing apparatus 1 over at least the aforementioned three data lines SCLK, State and DIO to exchange data over these data lines SCLK, State and DIO with the data processing apparatus 1. That is, the S/P P/S interface sequencer 13 converts the parallel data, sent from the page buffer 15, into serial data, which serial data is sent to the serial interfacing circuit 6 of the data processing apparatus 1. The S/P P/S interface sequencer 13 also converts the serial data, sent from the serial interfacing circuit 6 of the data processing apparatus 1, into parallel data, which is sent to the page buffer 15.

The serial data is transmitted between the S/P P/S interface sequencer 13 and the data processing apparatus 1 via third data line DIO, using the clock signals, sent from the data processing apparatus 1 over first data Line SCLK for synchronization. The sorts of the serial data exchanged over the second data line State may be discriminated by status signals transmitted on the second data line State. The sorts of the serial data may be exemplified by data to be written in e.g. the flash memory 12, data read out from the flash memory 12 or control data for controbg the operation of the memory card 2. The status signal is also used for indicating the state of the memory card 2. The status of the memory card 2, indicated by the status signal, may be exemplified by a state in which the memory card 2 is involved in some processing and cannot accept data entered from the data processing apparatus 1, and a state in which the processing on the side of the memory card has finished and the memory card is awaiting data input from the data processing apparatus 1, If the data sent from the data processing apparatus 1 is control data for controlling the operation of the memory card 2, the S/P P/S interface sequencer 13 sends the control data to a command generator 17.

The command generator 17 generates a control command for controlling the access to the flash memory 12, based on the control data sent from the data processing apparatus 1 via SP P/S interface sequencer 13, to transmit the control command to the flash memory interface sequencer 14. The flash memory interface sequencer 14 writes data in or reads out data from the flash memory 12, based on the control command, as will be explained later in detail.

To this command generator 17, there is connected an inadvertent erasure preventative switch 20. If this inadvertent erasure preventative switch 20 is on, the command generator 17 does not generate a control command which will erase data written in the flash memory 12, even if control data commanding the erasure of the data written in the flash memory 12 is sent from the data processing apparatus 1. That is, the memory card 2 is switched, by this inadvertent erasure preventative switch 20, between a state in which the data saved in the flash memory 12 cannot be erased and the state in which the data saved in the flash memory 12 can be erased.

The page buffer 15, arranged between the S/P P/S interface sequencer 13 and the flash memory interface sequencer 14, is a so called buffer memory, and transiently holds the data exchanged between the S/P P/S interface sequencer 13 flash memory interface sequencer 14.

That is, the data sent from the S/P P/S interface sequencer 13 to the flash memory interface sequencer 14 is fast sent from the S/P P/S interface sequencer 13 to the page buffer 15 where it is transiently stored. At this time, an error correction code is appended by the error correction circuit 16 to the data stored in the page buffer 15. The data with the error correction code appended thereto is sent from the page buffer 15 to the flash memory interface sequencer 14 in terms of a preset page (for example each page is formed by 512 bytes) as a unit.

Alternatively, the data sent from the flash memory interface sequencer 14 to the S/p P1S interface sequencer 13 is first sent from the flash memory interface sequencer 14 to the page buffer 15 for transient storage therein. At this time, the data stored in the page buffer 15 is corrected for errors by the error correction circuit 16. The data corrected for errors is sent from the page buffer 15 to the S/P P/S interface sequencer 13, in terms of a preset page as a unit.

The flash memory interface sequencer 14 writes data in or reads out data from the flash memory 12 from the command generator 17, under control by a control command from the command generator 17. That is, the flash memory interface sequencer 14 reads out data from the flash memory 12 to send out data via page buffer 15 to the §/I? P/S interface sequencer 13. Alternatively, the flash memory interface sequencer 14 receives data from the SP P/S interface sequencer 13 via page buffer 15, as described above, based on the control command from the command generator 17, to write the data in the flash memory 12.

In the configuration ROM 18, there are stored e.g. the version information and a variety of the attribute information of the memory card 2. The information stored in the configuration ROM 18 is used as it is read out as necessary by the command generator 17 via S/P P/S interface sequencer 13. That is, the command generator 17 reads out the information stored in the configuration ROM 18 as necessary to effect settings of various sorts pertinent to the memory card 2 based on the so read-out information.

When the data written in the flash memory 12 is sent as serial data from the data processing apparatus 1 to the memory card 2 via the three data lines SCLK, State and DIO, the S/P P/S interface sequencer 13 converts the serial data into parallel data, which then is sent to the page buffer 15. The data sent from the S/P P/S interface sequencer 13 is then transiently stored in the page buffer 15. At this time, an error correction code is appended by the error correction circuit 16 to the data stored in the page buffer 15. The data, having the error correction code, appended thereto, is sent out to the flash memory interface sequencer 14 every preset page unit. The flash memory interface sequencer 14 writes data, sent from the page buffer 15, in the flash memory 12, under a control command from the command generator 17. By the above processing, the data sect from the data processing apparatus 1 is written in the flash memory 12.

In reading out data from the above-described memory card 2, data is read out from the flash memory 12, by the flash memory interface sequencer 14, under a control command from the command generator 17. The flash memory interface sequencer 14 sends out data, read out from the flash memory 12, to the page buffer 15. The data sent from the flash memory interface sequencer 14 is transiently stored in the page buffer 15. The data stored in the page buffer 15 is corrected for errors by the error correction circuit 16. The data, corrected for errors, is sent out to the S/P P/S interface sequencer 13 in terms of a preset page unit as a unit. The S/P P/S interface sequencer 13 converts the data, sent from the page buffer 15, into serial data, which then is sent to the data processing apparatus 1 via the aforementioned three data lines SCLK, State and DIO. By the above processing, the data read out from the flash memory 12 is sent out to the data processing apparatus 1. In writing or reading out data, not only is data written in or read out from the flash memory 12 exchanged, but control data used for controlling the exchange is sent from the data processing apparatus 1 to the S/P P/S interface sequencer 13 of the memory card 2. The control data is sent from the S/P P/S interface sequencer 13 to the command generator 17. Based on the control data, sent item the SP P/S interface sequencer 13, the command generator 17 generates a control command which controls the access to the flash memory 12. This control command is sent to the flash memory interface sequencer 14, which flash memory interface sequencer accesses the flash memory 12 to write or read out the data, based on the control command.

Figure 3:
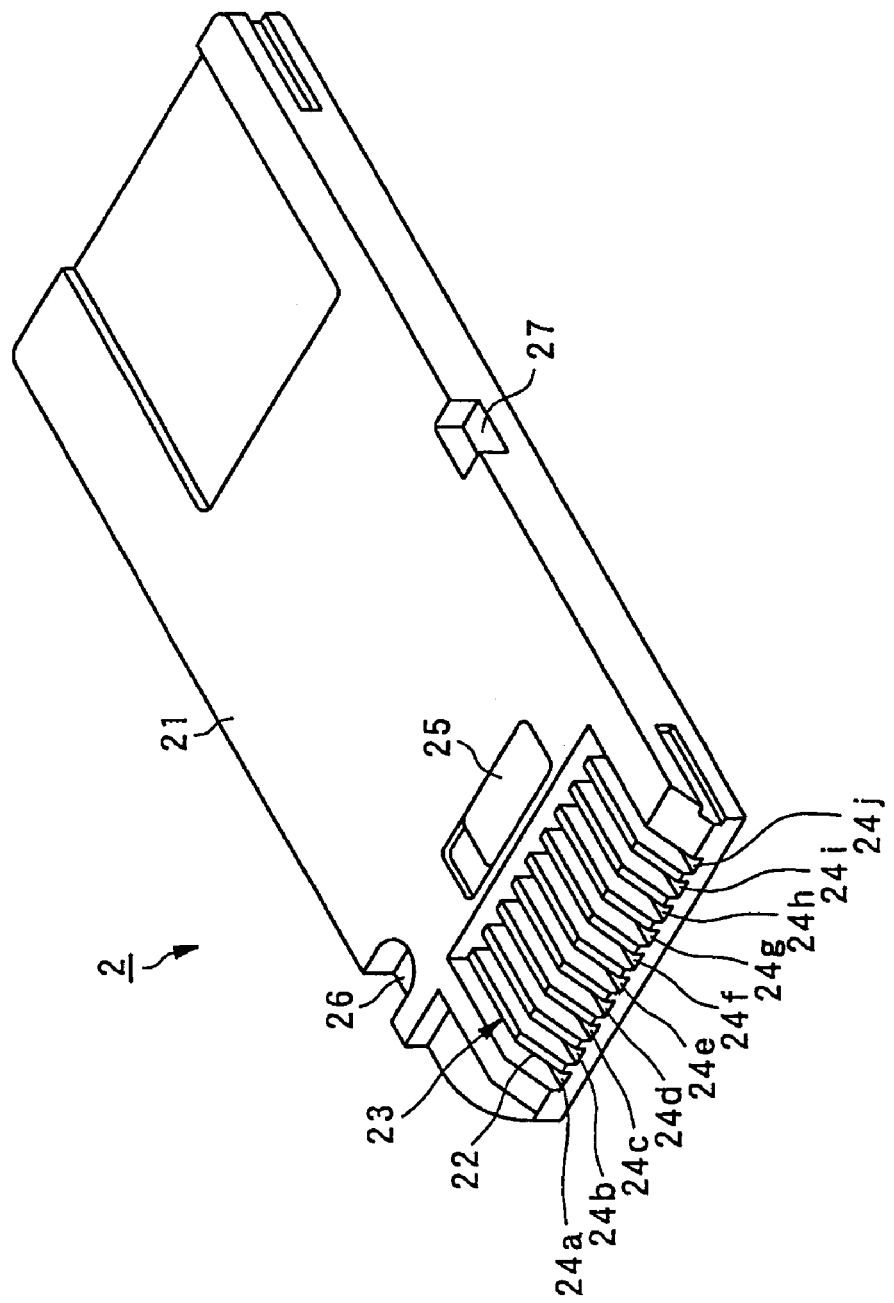
FIG. 3 is a perspective view of a memory card embodying the present invention.

Meanwhile, the memory card 2 may be provided not only with the aforementioned three data lines SCLK, State and DIO, but also with wiring for supplying the voltage or with reserve wiring which is usually not used. FIGS. 2 and 3 show a case where four conductors VSS 1, VSS2, VCC and I', as conductors for the power supply lines, and three reserve wires RSV1, RSV2 and RSV3, are provided to the memory card 2, in addition to the three data lines SCLK, State and DIO described previously.

3. Appearance of Memory Card

Referring to FIG. 3, the specified outer profile of the above-described memory card 2 is hereinafter explained.

The memory card 2 is comprised of a casing 21 of e.g. synthetic resin, with a rectangular planar shape, designed as a thin-walled card-shaped casing, and the aforementioned controller 11 or the flash memory 12, enclosed therein. This memory card 2 is used as it is loaded on the data processing apparatus 1 including a loading mechanism for loading the memory card 2 thereon.

The forward end of the casing 21 of the memory card 2 is formed with a bias cut section 22 and ten recesses 23 in this bias cut section 22. Within these recesses 23, there are provided terminals for external connection, which are connected to connection terminals of the data processing apparatus 1 when the memory card 2 is loaded in position on the loading device of the data processing apparatus 1. That is, the present memory card 2 includes ten terminals 24a to 24j as terminals for external connection, more specifically, three terminals 24b, 24d and 24h for the data Lines, four power supply terminals 24a, 24f, 24i, 24j and three reserve terminals 24c, 24e and 24g.

On the upper surface of the casing 21 of the memory card 2 is mounted an inadvertent erasure preventative member 25. 'This inadvertent erasure preventative member 25 is engaged with the inadvertent erasure preventative switch 20, housed in the casing 21, so that the inadvertent erasure preventative switch 20 may be turned on or off by sliding the inadvertent erasure preventative member 25.

For preventing the memory card 2 from being detached from the data processing apparatus 1, on loading the memory card 2 in position on the data processing apparatus 1, an accurate first lock recess 26 is formed in one lateral side of the casing 20, while a rectangular second lock recess 27 is formed in opposite lateral side thereof. When the memory card 2 is loaded in position on the loading device of the data processing apparatus 1, the lock recesses are engaged by the loading device of the data processing apparatus 1.

The memory card 2, shown in FIG. 3, is merely illustrative of an external storage device according to the present invention. That is, the present invention may be applied to an external storage device of any suitable outer shape, without dependency on any particular outer shape of the storage device.

4. Structure of the Storage Area

The structure of the storage area of the flash memory 12, loaded on the above-described memory card 2, is now explained.

Figure 4:
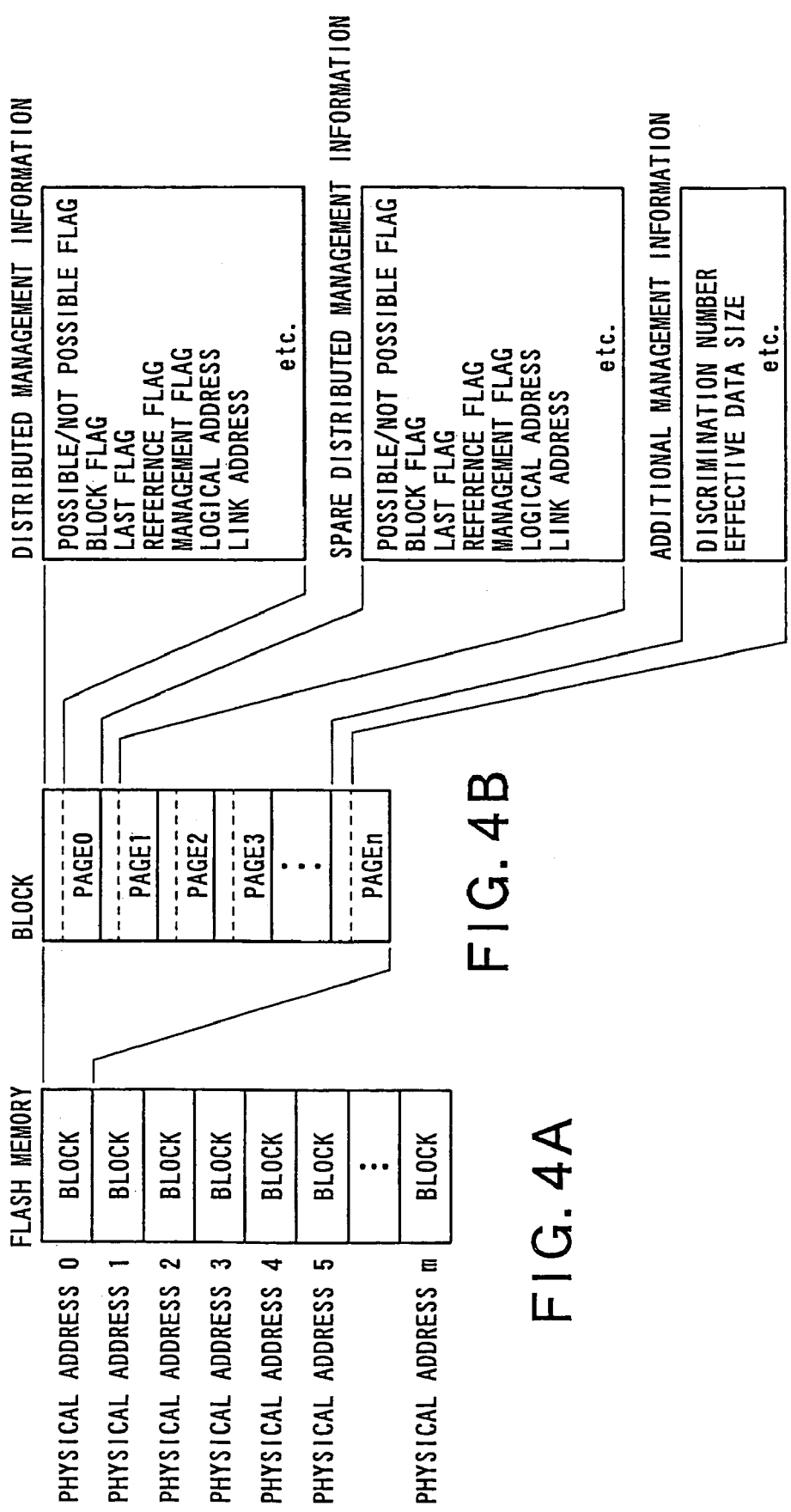
FIGS. 4A to 4C show the configuration of a storage area of a memory card embodying the present invention.

The storage area of the flash memory 12 is divided into plural blocks, as data erasure units, as shown in FIG. 4A. These blocks are classed into boot blocks, in which to store boot data, as data first written by the data processing apparatus 1 on booting the memory card 2, and data blocks in which to write optional data. Each block is provided with an intrinsic physical address. These blocks are data erasure units, while being the smallest units for file management. That is, a sole file is stored in one or plural blocks, while a sole block cannot be used by plural files.

Each block is made up by plural bits, capable of assuming two states '0' or '1'. In the initial state, all bits are '1', and bit-based change only from '1' to '0' is possible. That is, in writing data made up of '1' and 'O', bits for '1' are kept unchanged, while bits for '0' are changed from '1' to '0'.

If data, once written, is erased, an initializing processing is carried out in a lump, on the block basis, to set all bits of the block to '1'. This erases the data, written in the block, in a lump, so that the block is again in the data write enabled state.

Meanwhile, in changing from '0' to '1', the initializing processing must be carried out in a lump, on the block basis, to set all bits of the block to '1'. On the other hand, change from '1' to '0' is possible without resorting to the block-based lumped initializing processing. In the following explanation, changing from '1' to '0' without resorting to the block-based lumped initializing processing is termed 'overwrite'.

It is noted that the present invention is applicable not only to a flash memory in which the respective bits may assume only two states (so-called bi-valued flash memory), but also to a flash memory in which the respective bits may assume three or more states (so-called multi-valued flash memory).

Each block of the flash memory 12 is made up by plural pages, each acting as a data write or readout unit, as shown in FIG. 4B. That is in writing data in this flash memory 12, data sent from the page buffer 15 on the page basis is written In the flash memory 12, by the flash memory interface sequencer 14, again on the page basis. in reacting out data from the flash memory 12, rhe data is read out on the page basis, by the flash memory interface sequencer 14, and thence sent to the page buffer 15.

Each page has a data area and a redundant area. The data area is an area in which to write optional data, whilst the redundant area is an area in which to store the information necessary for supervising the data written in the data area.

Specifically, the so-called distributed management information is stored in the redundant area of the leading page of a block, as the information necessary for supervising the block, as shown in FIG. 4C. In the redundant areas of the second page et seq. of the block, there is stored, as the spare disD3uted management information, the same distributed management information as that stored in the redundant area of the leading page. However, in the redundant areas of the last page, not the distributed management information but the so-called additional management information, is stored, as the additional information that may be beyond the power of the distributed management information.

In this manner, the distributed management information is stored in the redundant area of each block in this flash memory 12. The distributed management information is the information for supervising the block in which the distributed management information has been stored. By this distributed management information, it is possible to obtain e.g. the information as to whether or not the block in question is the leading block in the file, or the information indicating the block linkage in case a file is made up by plural blocks. This distributed management information will be explained in detail subsequently.

In this memory card 2, the distributed management information of the respective blocks is collected to form the so-called aggregate management information, as the information for supervising the overall flash memory, to store the aggregate management information as a file in the flash memory 12.

Usually, the information necessary for accessing each block is obtained by the aggregate management information. That is, in exchanging data between the data processing apparatus 1 and the memory card 2, the data processing apparatus 1 reads out the aggregate management information from the memory card 2 and formulates a management table in the internal memory 4 to access the memory card 2 based on this management table. This enables a faster data access operation because there is no necessity for accessing the distributed management information stored in each block in each data access operation.

5. Distributed Management INFORMATION

The distributed management information is now explained in detail.

Figure 5:
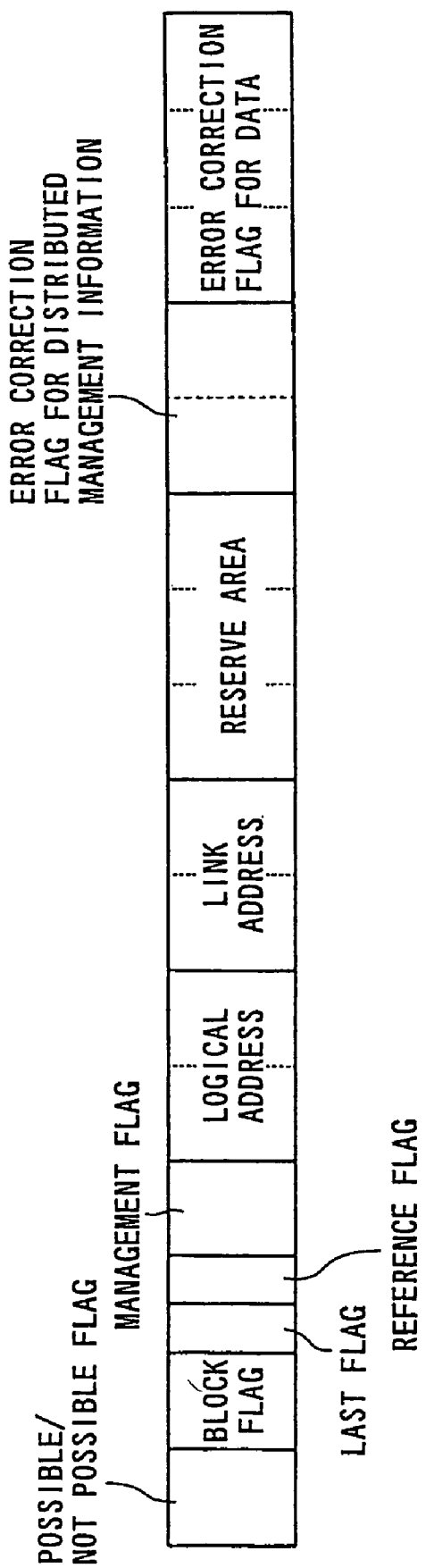
FIG. 5 shows the configuration of the distributed management information.

The distributed management information is the information for supervising the block in which the distributed management information has been stored, and is written in a 16-byte redundant area, Specifically, the distributed management information is made up by a 1-byte possible/not possible flag, a 1-byte block flag, a 4-bit last flag, a 4-bit reference flag, a 1-byte management flag, a 2-byte logical address, a 2-byte link address, a 3-byte reserve area, a 2-byte error correction flag for the distributed management information, and a 3-byte error correction code for data, as shown in FIG. 5.

The possible/not possible flag is a flag for indicating whether the block in question is in the usable state or in the non-usable state. Specifically, the flag indicates the 'usable' and 'unusable' states. The 'usable' indicates that the block in question is in the usable state, whilst the 'unusable' indicates that the block in question is in the unusable state. For example, if an unrecoverable error has been produced in the block, this possible/not possible flag is set to 'unusable', thus indicating that the block in question is unusable.

The block flag is a flag indicating the state of the block. Specifically, it indicates the four states of 'not as yet used', 'used at the leading end', 'used' and 'not as yet erased'. The state 'not as yet used' indicates that the block is not as yet used or erased, is in the initialized state (with all bits being '1') such that data can be written at once. The state 'used at the leading end' indicates that the block in question is used at the leading end of a file. Meanwhile, in a boot block, having stored therein boot data, the block flag is the 'used at the leading end'. The state 'used' indicates that the block in question is used in other than the leading end of a file. If the block flag is 'used', it indicates that the block in question is coupled from another block. The state 'not as yet erased' indicates that the data written in the block in question has become invalid. For example, if data is erased, the block flag is set to 'not as yet erased' and, when there is certain time allowance, the block whose block flag is 'not as yet erased' is erased. This assures efficient erasure processing operations.

The last flag is a flag indicating whether or not a file has come to a close. Specifically, the flag indicates the two states of 'block continue' and 'block end'. The state 'block continue' indicates that a file stored in the block in question is not final and continues to another block. The state 'block end' indicates that the block is the final block. That is, the state 'block end' indicates that the file stored in the block comes to a close with this block.

The reference flag is a flag for specifying the reference to the additional information. Specifically, the flag indicates the two states of 'there is no reference information' and 'there is reference information', The state 'there is no reference information' indicates that there is no effective additional management information in the redundant area of the last page of the block, whilst the state 'there is reference information' indicates that there is the effective additional management information in the redundant area of the last page of the block.

The management flag is a flag indicating e.g. the attributes of a block, For example, the management flag indicates whether the block in question is a read-only block or a block which is also rewritable. This management flag also indicates whether the block is a boot block or a data block.

The logical address literally indicates the logical address of the block. The value of the logical address is updated, as necessary, in case of re-writing data. Meanwhile, the value of the logical address is set so that the same value of the same logical address is not owned by plural blocks at the same time.

Meanwhile, if, in a flash memory, data is to be rewritten in the same block, block erasure needs to be carried out first, as discussed above. However, there is an upper limit to the allowed number of times of possible erasure, such that it is required to reduce the number of times of block erasure to as small a value as possible. Thus, in updating data of a given block, new data is written in another block, without rewriting to new data using the given block. In this case, the block flag of the block, in which data was stored, is set to 'not as yet erased' for indicating that the data stored in the block in question has become invalid. If, in this memory card 2, the data has been updated in this manner, the logical address, which may be changed dynamically, is allocated to each block, apart from the physical address pre-set in each block, so that the address indicating the block having stored therein the data in question will be the same, in such a manner that the block, having the data stored therein, will be represented by this logical address.

The link address indicates the logical address of a block linked to the block in question. That is, if there is a sequel to a file stored in a block, such that the fde is continuing to another block, the value of the logical address of the next block, in which is stored the sequel of the file, is set as the link address.

The error correction code for the distributed management information is an error correction flag for data in the distributed management information which have been written in the management flag, logical address, link address and in the reserve area. Meanwhile, the possible/not possible flag, block flag, last flag and the reference flag are not the subject of error correction by the error correction code for the distributed management information. Consequently, the possible/not possible flag, block flag, last flag and the reference flag may be rewritten without updating the error correction code for the distributed management information.

The error correction code for data is the error correction code for data written in the data area of the page having stored therein the error correction code for data.

The error correction code for the distributed management information is an error correction code for data are used by the error correction circuit 16 arranged in the memory card 2. Consequently, for error correction, employing these error correction codes, any optional technique, which depends not on the data processing apparatus 1 but depends on the memory card 2, may be used.

6. Additional Management Information

The additional management information is now explained in detail.

The additional management information is the information stored in the 16-byte redundant area of the last page of the block, and comprises the additional information that may be beyond the power of the distributed management information.

Figure 6:
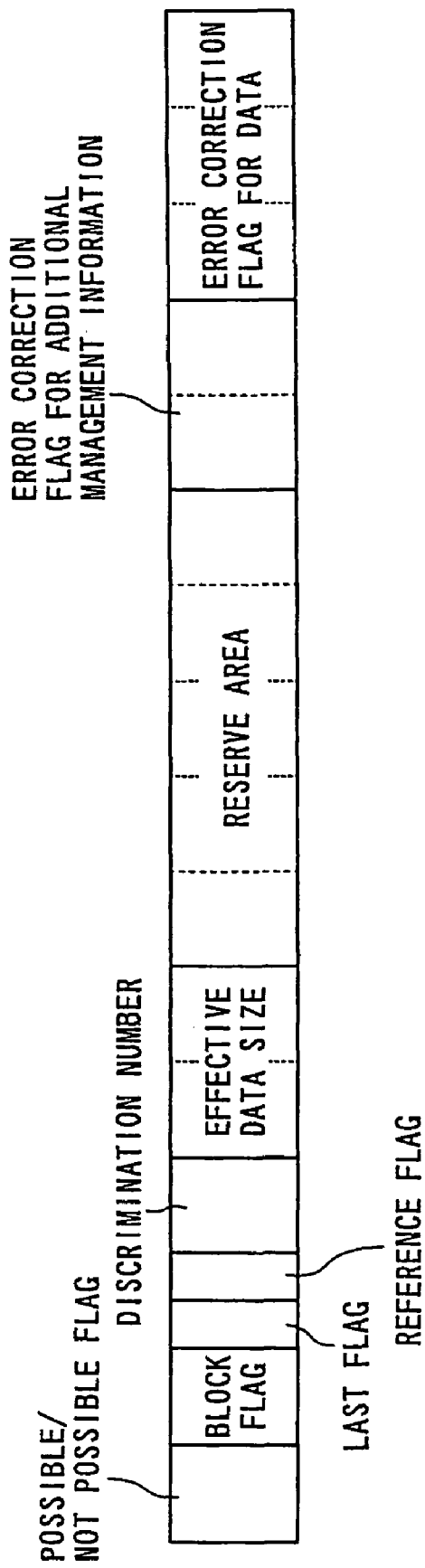
FIG. 6 shows the configuration of the additional management information.

Specifically, the additional management information is made up by a 1-byte possible/not possible flag, a 1-byte block flag, a 4-bit last flag, a 4-bit reference flag, a 1-byte discrimination number, a 2-byte effective data size, a S-byte reserve area, a 2-byte error correction flag for the additional management information, and a 3-byte error correction code for data, as shown in FIG. 6.

The possible/not possible flag, block flag, last flag, reference flag, reserve area and the error correction code for data, are the same as those of the distributed management information. The error correction code for the additional management information is equivalent to the error correction code for the distributed management information in the distributed management information, and is the error correction code for data written in the discrimination number, effective data size and the reserve area of the additional management information.

The discrimination number and the effective data size are included in the additional management information, as being the additional information that may be beyond the power of the distributed management information.

The discrimination number is the information for error processing and has its value incremented every time block data are rewritten. This discrimination number is used for discriminating the timely sequence of data written in plural blocks having the same logical address in case some error has occurred and these plural blocks have come to be of the same logical address. For this discrimination number, a 1-byte area is used, and has a value range of from '0' to '255', with the initial value being '0'. If the discrimination number has exceeded 255, it is reset to '0'. Should there be plural data blocks of the same logical address, the data block having the smaller value of the discrimination number is the valid one. However, if, in the case of boot blocks, there are spare boot blocks, the discrimination numbers of these boot blocks are normally of the same value. If, under some unusual states, these boot blocks are of different values, the boot blocks with larger discrimination values are valid ones.

The effective data size indicates the size of the effective data in the block. That is, if there is any vacant portion in the data area of a given block, a value indicating the size of data written in the data area is set in the effective data size. In this case, the reference flag of the distributed management information is set t3 'there is reference information'. If there is no vacant portion in the data area of the block, 'Oxfff' is set in the effective data size as a value indicating that there is no vacant portion in the data area.

The distributed management information and the additional management information, described above, are updated to the latest information every time block data is updated.

7. Aggregate Management Information

The aggregate management information is now explained in detail. The aggregate management information is the information formed on collecting the distributed management information of the respective information together, as described above, and is stored as file in the flash memory 12. That is, a file of the aggregate management information, as the information for collectively supervising the respective blocks, is formed, from the distributed management information of the respective blocks, as shown in FIG. 7, and is stored in a data area of a preset block. Meanwhile, the aggregate management information may be stored in a block or in plural blocks. The data processing apparatus 1 usually acquires the information, as needed for accessing respective blocks, by this aggregate management information.

That is, if the aggregate management information, effective for the memory card 2, is stored as a file in the memory card 2, the data processing apparatus 1 reads out a file of the aggregate management information to store the so read out file in the internal memory 4 to formulate a management table for supervising the memory card 2. Meanwhile, the physical address of the block, having stored the leading part of the file of the aggregate management information, is contained in the boot data and the data processing apparatus 1 accesses the file of the aggregate management information based on this physical address.

Referring to FIG. 8, this aggregate management information includes a header for the aggregate management information, a bit map table showing the state of the respective blocks, a conversion table for converting the specified logical address to the physical address, in accessing the block, and a link table indicating the block next to a given block.

In the bit map table, there are stored the information extracted from the distributed management information of each block, such as a possible/not possible flag, a block flag, a last flag, a reference flag and a management flag.

Referring to FIG. 9, the conversion table is a table stating the physical address associated with the logical address. An area in which to store the physical address is two bytes per entry. If this conversion table is formed from this conversion table, the logical address, written in the distributed management information of a target block, and the physical address of the block, are registered in the corresponding position of the table. If the logical address is not used, the corresponding physical address is set to 'Oxfff'.

Figure 10:
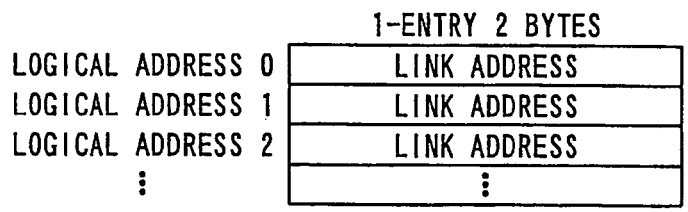
FIG. 10 shows a link table.

Referring to FIG. 10, the link table states link addresses for the physical addresses. The area in which to store the link addresses is 2 bytes per entry. When forming this link table from the distributed management information, the link address, written in the distributed management information of the target block, is checked, and the link address of the block is registered in the corresponding position of the table.

8. Sequence of Operations in Booting Memory Card

The sequence of operations in booting the memory card 2 is now explained with reference to the flowchart of FIG. 11.

Figure 11:
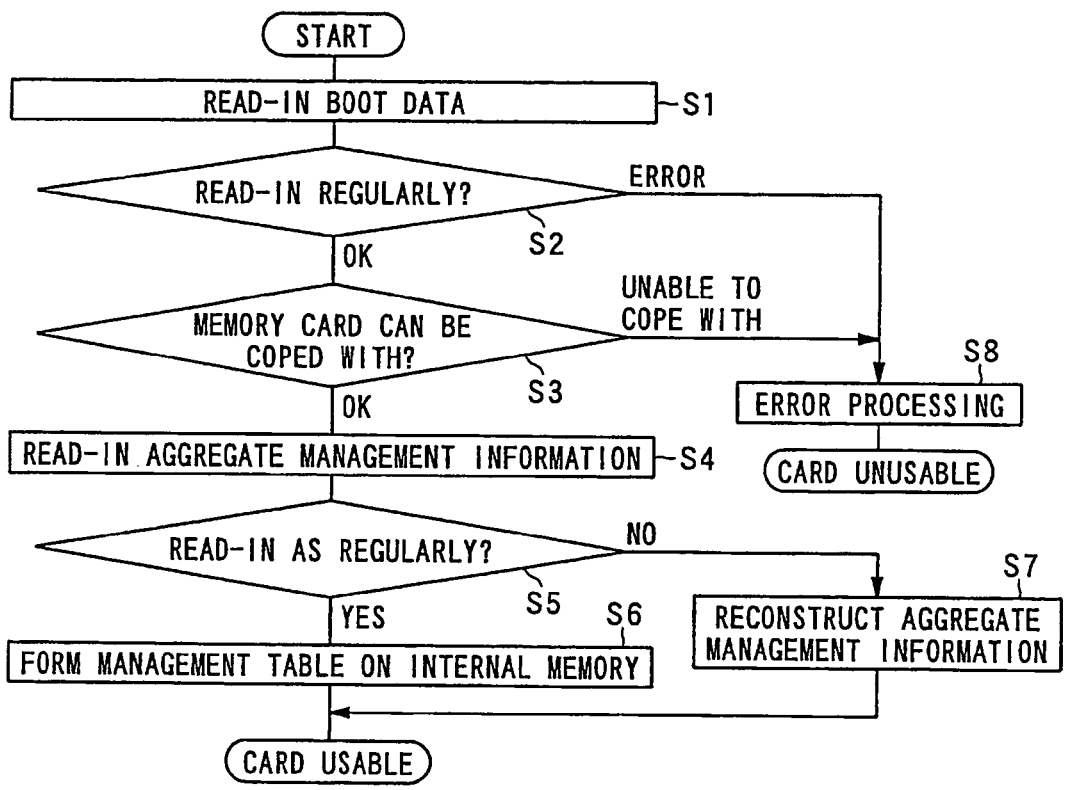
FIG. 11 depicts a flowchart showing the sequence of operations in booting a memory card.

In booting the memory card 2, the data processing apparatus 1 in a step S1 in FIG. 11 reads in boot data from a boot block of the memory card 2. The data processing apparatus 1 then proceeds to a step S2.

In this step S2, the data processing apparatus 1 checks to see that the boot data reading from the boot block has been carried out as regularly. If the boot data has been read in as regularly, the data processing apparatus 1 proceeds to a step S3. If otherwise, the data processing apparatus 1 proceeds to a step S8.

In the step S3, the data processing apparatus 1 determines, based on the reading boot data, whether or not the memory card 2 is in keeping with the data processing apparatus 1. If the memory card 2 is in keeping with the data processing apparatus 1, the data processing apparatus 1 proceeds to a step S4. If otherwise, the data processing apparatus 1 proceeds to the step S8.

In the step S4, the data processing apparatus 1 reads in the aggregate management information from the memory card 2. Meanwhile, the physical address of the block, having stored the aggregate management information, is specified in the boot data. The data processing apparatus 1 then proceeds to a step S5.

In this step S5, the data processing apparatus 1 checks to see whether or not the effective aggregate management information has been read in as regularly. If the effective aggregate management information has been read in as regularly, the data processing apparatus 1 proceeds to a step S6. If otherwise, the data processing apparatus 1 proceeds to a step S7.

In the step S6, the data processing apparatus 1 causes the read-in aggregate management information to be stored in the internal memory 4 to formulate the management table for supervising the memory card 2. The above-described processing completes the initializing processing in startup of the memory card 2, so that the memory card 2 may now be used.

If it is verified in the step S5 that the effective aggregate management information has not been read in as regularly, the data processing apparatus 1 proceeds to the step S7, as described above. In the step S7, the data processing apparatus 1 reads out the distributed management information of the respective blocks to re-construct the aggregate management information. The aggregate management information is expanded in the internal memory 4 to formulate the management table for supervising the memory card 2. The above processing completes the processing on startup of the memory card 2, so that the memory card 2 is now usable.

If it is determined in the step S2 that an error has been produced in reading in boot data, or if it is determined in the step S3 that the memory card 2 is not in keeping with the data processing apparatus 1, the data processing apparatus 1 proceeds to the step S8, as described above.

It is when the memory card 2 is not usable that the data processing apparatus 1 proceeds to the step S8. Hence, in this step S8, the data processing apparatus 1 performs preset error processing, such as displaying a message 'not usable', to terminate the boot processing for the memory card 2.

9. Handling of Aggregate Management Processing in Data Update Processing

Every time the data processing apparatus 1 performs the processing of writing data in the memory card 2, or erasing the data therefrom, the data processing apparatus 1 incidentally updates the management table, held in the internal memory 4, into matching with the actual state of the memory card 2, that is, into matching with the contents of the distributed management information. The processing of writing data in or erasing the data from the memory card 2 is referred to below as 'data update processing'. On the other hand, the aggregate management information stored as a file in the memory card 2, is not updated, every data processing operation, but change contents thereof are updated in a lump at a suitable timing.

In general, there is an upper limit to the number of times of possible rewrite operations for the flash memory 12. By carrying out the rewriting of the aggregate management information in a lump, and collectively to a more or less extent, the number of times of rewrite operations of the block, having stored therein the aggregate management information, may be diminished, thereby prolonging the useful life of the memory card 2.

It should be noted that data updating must be preceded by invalidation of the file of the aggregate management information stored in the memory card 2, in order not to impair the integrity of the distributed management information and the aggregate management information. In data updating, the distributed management information of a block being processed is updated simultaneously. However, the contents of the aggregate management information are not updated simultaneously, and hence the distributed management information and the aggregate management information are not matched to each other. Thus, in such case, the file of the aggregate management information, stored in the memory card 2, is invalidated.

Figure 12:
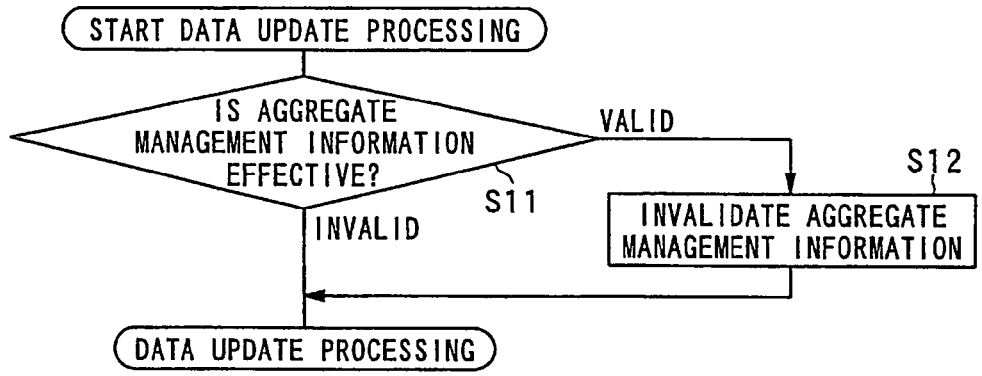
FIG. 12 depicts a flowchart showing the sequence of operations in data update processing.

Specifically; when updating the data, the data processing apparatus 1 in a step S11 in FIG. 12 verifies whether or not the aggregate management information stored in the memory card 2 is valid. If the aggregate management information is already invalid, the data processing apparatus 1 directly proceeds to data update processing. If conversely the aggregate management information is valid, the data processing apparatus 1 proceeds to a step S12.

In the step S12, the data processing apparatus 1 invalidates the aggregate management information. Specifically, the block flag of the block, having the file of the aggregate management information stored therein, is set to 'not as yet erased', or the block is subjected to erasure processing to erase the data. After invalidating the aggregate management information, the data processing apparatus 1 proceeds to data update processing.

The file of the aggregate management information, stored in the memory card 2, is invalidated during data update processing. However, the contents of the management table, stored in the internal memory 4 of the data processing apparatus 1, are updated from time to time, in order to maintain the latest state at all times. The data processing apparatus 1 usually supervises the respective blocks, based on this management table.

The aggregate management information, invalidated during the data update processing, is re-written in the memory card 2, at a suitable timing, so as to be valid data again. The suitable timing here means e.g. the timing when the use of the memory card 2 has come to a close and the power supply is turned off, the timing when access to the memory card 2 has no been made for longer than a preset time, or the timing when no data rewrite operation has been carried out for longer than a preset time.

Figure 13:
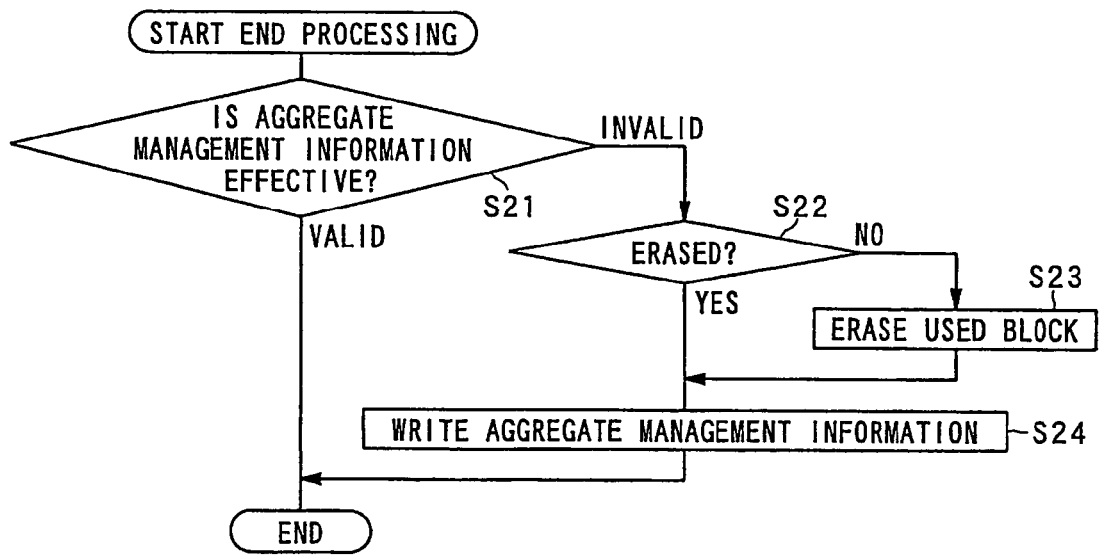
FIG. 13 depicts a flowchart showing the sequence of operations in terminating the processing.

Specifically, the end processing shown in FIG. 13 is carried out before the use of the memory card 2 has come to a close to turn off the power supply, in order to render the aggregate management information effective.

In this end processing, the data processing apparatus 1 first verifies whether or not the aggregate management information stored in the memory card 2 is valid. If the aggregate management information is valid, processing is directly terminated. If the aggregate management information is invalid, processing transfers to a step s22.

In the step S22, the data processing apparatus 1 first verifies whether or not the block, having the file of the aggregate management information stored therein, has been erased. If the file has been erased, processing transfers to a step S23 and, if otherwise, processing transfers to a step S24.

In the step S23, the data processing apparatus 1 erases the block, where the file of the aggregate management information is stored. The data processing apparatus then proceeds to a step S24.

In the step S24, the data processing apparatus 1 writes the aggregate management information in the memory card 2. "he data processing apparatus 1 also formulates a file of the new aggregate management information, based on the contents of the management table, held in the internal memory 4, and writes the file of the new aggregate management information in the memory card 2. This causes the effective aggregate management information, indicating the latest state of the memory card 2, to be stored in the memory card 2.

The above completes the end processing such that the effective aggregate management information has now been stored in the memory card 2.

10. Writing of New File

The sequence of operations in writing a new file in the memory card 2 is now explained. The sequence of operations in writing a file in the memory card 2 differs depending on whether or not the file size has been known from the outset.

10-1 The Case where the File Size has been Known from the Outset.

If the file size has been known from the outset, it is checked, whenever the data of the file is written in a new block, whether or not the data may be accommodated in the block in question. If the data may not be accommodated in the block, the logical address of the next following block is procured, the data is written in the data area, and the distributed management information is written, with the logical address of the next following block as the link address. At this time, the last flag is set to the 'block continue'. On the other hand, if the data may be accommodated in the block, the fractional number portion of the data, that is, the vacant area of the data area, is set to '0xffff'. At this time, the last flag is set to 'block last' and the effective data size is written in the additional management information.

Figure 14:
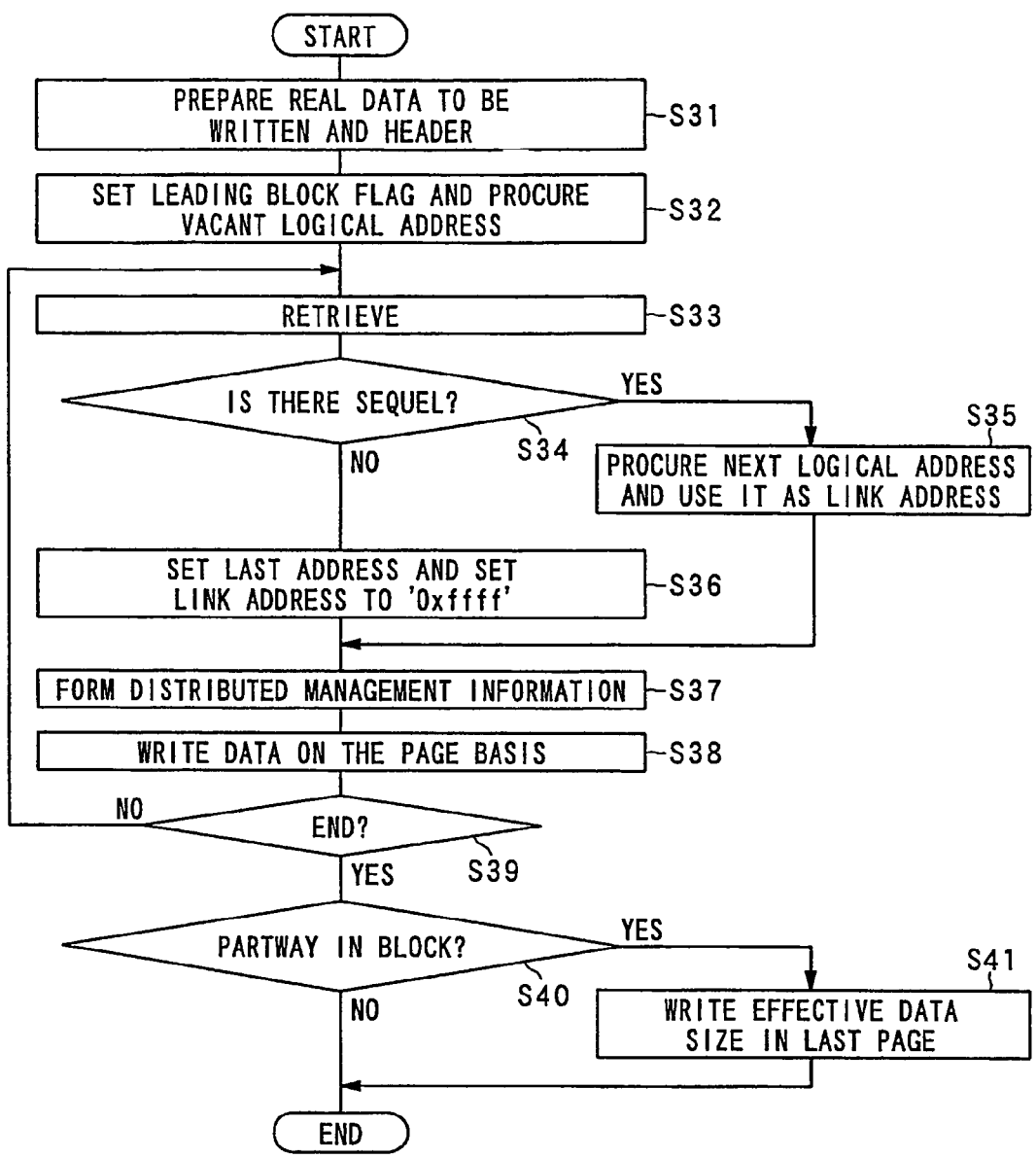
FIG. 14 depicts a flowchart showing the sequence of operations in writing a file with a known size in a memory card.

The sequence of operations of writing the file, the size of which has been known from the outset, in the memory card 2, is explained in detail by referring to the flowchart shown in FIG. 14. In the flowchart shown in FIG. 14 and in the flowcharts shown in FIGS. 15 and 17, inspection of the inadvertent erasure preventative switch 20 of the memory card 2 or the processing in case some error has occurred is omitted.

In writing a file, the size of which has been known from the outset, in the memory card 2, the data processing apparatus 1 in a step S31, provides real data written in the memory card 2 and a header for the real data. Stated differently, the data processing apparatus 1 in the step S31 provides a file to be written in the data area of the memory card 2. The information on the Ne size is contained in the file header. The data processing apparatus 1 then proceeds to a step S32.

In the step S32, the data processing apparatus 1 sets the block flag of the block, where the file is stored first, to 'used at the leading end'. The data processing apparatus 1 then procures the vacant logical address, before proceeding to a step S34.

In the step S33, the data processing apparatus 1 retrieves a vacant physical address, before proceeding to a step S34.

In the step S34, the data processing apparatus 1 checks to see whether or not the file may be accommodated in the block being processed. If the file may not be accommodated in the block, and there is a sequel to the file, the data processing apparatus 1 proceeds to a step S35 and, if the file may be accommodated in the block, and there is no sequel to the file, the data processing apparatus 1 proceeds to a step S36.

In the step S35, the data processing apparatus 1 procures the logical address Of the next following block and sets this logical address as the link address. The data processing apparatus 1 then proceeds to the next step S37.

In the step S36, the data processing apparatus 1 sets the last flag to the 'block last, while setting the link address to '0xffff', before proceeding to a step S37.

In the step S37, the data processing apparatus 1 formulates the distributed management information, pertinent to the block being processed, based on e.g. the information as set in the steps up to the current step, before proceeding to a step S38.

In the step S38, the data processing apparatus 1 sequentially writes data in the block being processed, on the page basis. If the file may not be accommodated in the block being processed, one-block data is written on the page basis. If the file may be accommodated in the block being processed, only needed pages of the data are written on the page basis. Meanwhile, it is data of a file newly written and the distributed management information formed in the step S37 that are written in the block. The data processing apparatus 1 then proceeds to a step 539.

In the step S39, the data processing apparatus 1 checks to see whether or not the totality of data of the Ne has been written in the memory card 2. If the writing has not been terminated, and there are as yet data to be written, processing reverts to the step S33 to repeat the processing. If the writing has come to a close, the processing transfers to a step S40.

In the step S40, the data processing apparatus 1 verifies whether or not the data written has come to an end partway in a block. If the data written has come to an end partway in a block, the data processing apparatus 1 proceeds to a step S41 and, if data has been stored up to the end of the block, the processing comes to a close.

In the step S41, the data processing apparatus 1 writes the effective data size in the additional management information stored in the redundant area of the last page. That is, the data processing apparatus 1 writes a value indicating the size of the data written in the data area of the block, having stored therein the last part of the file, in the additional management information of the block, as effective data size.

he above completes the processing of writing in the memory card 2 of the file, the size of which has been known from the outset.

10-2 Case in which the File Size has not been Known

If the file size has not been known in advance, the logical address of the next following block is always procured and, at a time point the data has come to a close, the last flag of the last block is set by overwrite. The distributed management information and the additional management information are set in a manner similar to a case where the file size is known at the outset.

Figure 15:
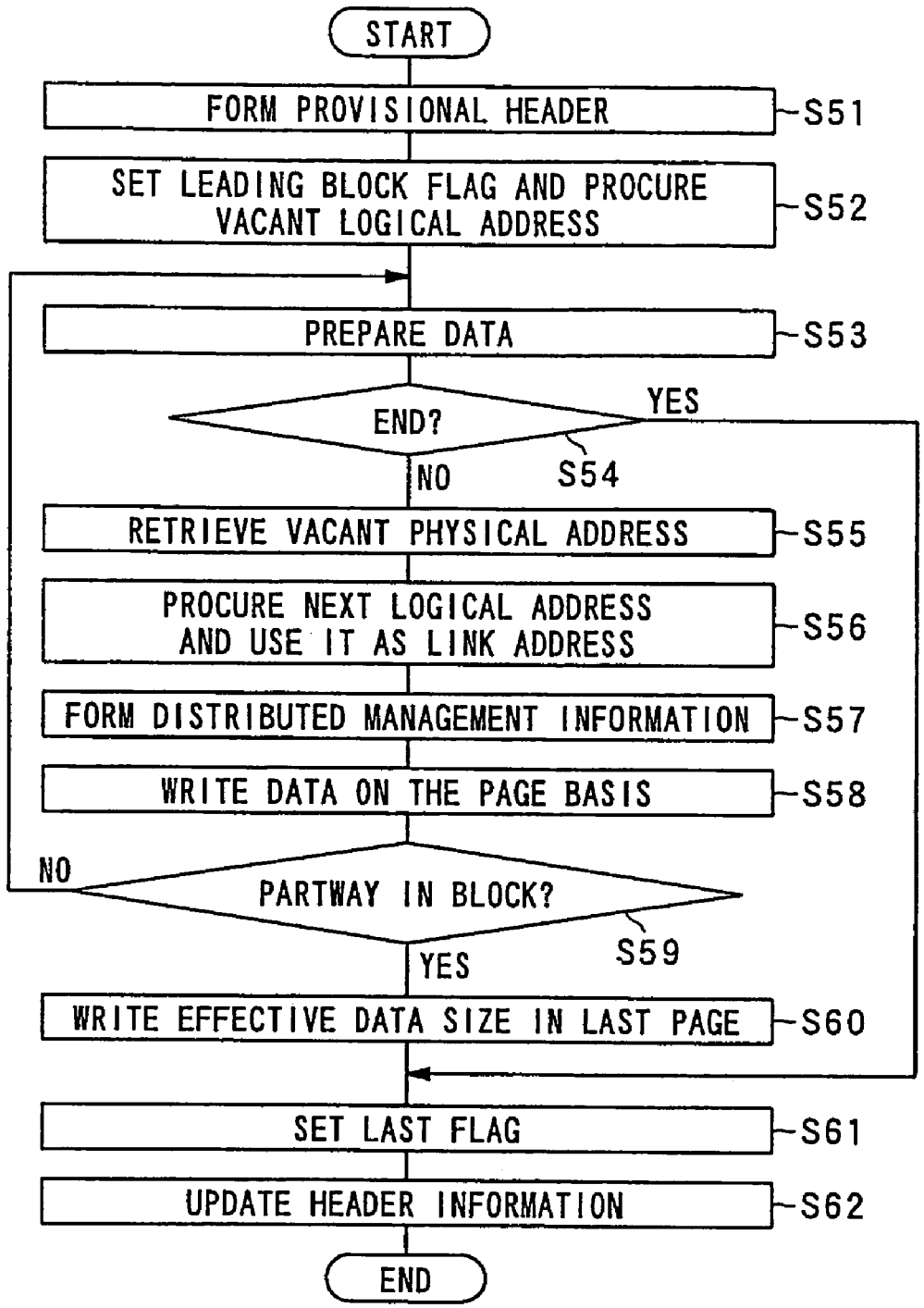
FIG. 15 depicts a flowchart showing the sequence of operation in writing a file with an unknown size in a memory card.

Referring to the flowchart of FIG. 15, the sequence of operations for writing the file, the size of which is not known at the outset, is now explained in detail.

In writing the file, the size of which is not known at the outset, the data processing apparatus 1 in a step S51 formulates a provisional header of a file written in the memory card 2. Since the file size is not known at this stage, the information on the file size is not contained in the provisional header. The data processing apparatus 1 then proceeds to a step S52.

In this step S52, the data processing apparatus 1 sets the block flag of the block, where the file is initially stored, to 'used at the leading end'. The data processing apparatus also procures a vacant logical address, before proceeding to a step S53.

In the step S53, the data processing apparatus 1 provides data written in the memory card 2, before proceeding to a step S54.

In the step S54, the data processing apparatus 1 verifies whether or not there is any data to be written in the memory card 2. If the data is not depleted, and left, the data processing apparatus proceeds to a step S55. If the data is depleted and is not left, the data processing apparatus proceeds to a step S61.

In the step S55, the data processing apparatus 1 retrieves a vacant physical address, before proceeding to a step S56.

In the step S56, the data processing apparatus 1 procures the logical address of the next following block, and sets this logical address as the link address, before proceeding to a step S57.

In the step S57, the data processing apparatus 1 formulates the distributed management information, for the block being processed, based on the information as set in the steps up to the current step, before proceeding to a step S58.

In the step S58, the data processing apparatus 1 sequentially writes data, on the page basis, in the block being processed. If a file may not be accommodated in the block being processed, one block of data is written on the page basis. If a file may be accommodated in the block being processed, only needed pages of the data are written on the page basis. Meanwhile, it is the data of a file newly written and the distributed management information formed in the step S57 that are written in this step S58 in the block. The data processing apparatus 1 then proceeds to a step S59.

In this step S59, the data processing apparatus 1 verifies whether or not the written data has come to a close partway in the data area of the block. If data is stored up to the end of the data area, processing reverts to the step S53 to repeat the processing. If data is depleted partway in the data area, processing transfers to a step 560.

In the step S60, the data processing apparatus 1 writes the effective data size in the additional management information, stored in the redundant area of the last page of the block being processed. That is, the data processing apparatus 1 writes a value indicating the size of data written in the data area of the block, having stored the last part of the file, as the effective data size, in the additional management information of the block in question. The data processing apparatus 1 then proceeds to a step S61.

In this step S61, the data processing apparatus 1 sets the last flag of the block being processed to 'block last' by overwrite, before proceeding to a step S62.

In the step S62, the data processing apparatus 1 updates the file header. That is, since the file size has become clear at this stage, the data processing apparatus 1 newly formulates a header, including the file size information, to rewrite the aforementioned provisional header to the new header including the He size information.

The above completes the processing of writing the file, the size of which was not known in advance, in the memory card 2.

11. File Updating

The processing sequence in updating the file stored in the memory card 2 is now explained.

In file updating, the logical address, which is the same as that of the block, the data of which is to be rewritten, is accorded to another block and new data is written in the block in question. The block having old data written therein is held at this time, without being opened, until the file update processing comes to a close. This enables the pre-update state of the file to be restored even supposing that a malfunction has occurred during the B e update processing.

A specified example of the sequence of operations for updating a file is now explained with reference to FIG. 16.

Figure 16A:
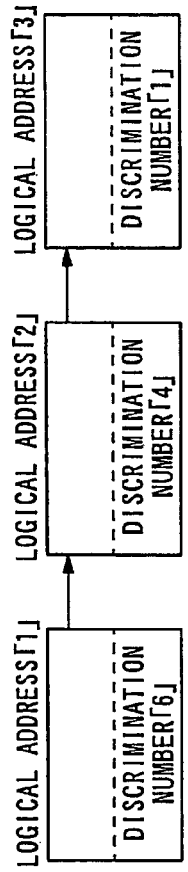
FIGS. 16A to 16C are illustrative views showing a concrete example of the file update processing.

It is assumed that the leading end of the file is stored in a block of the logical address '1', a next portion of the file is stored in a block of the logical address '2' and a further next portion thereof is stored in a block of the logical address '3', as shown in FIG. 16A. It is also assumed that the discrimination number of the block with the logical address '1' is '6', the discrimination number of the block with the logical address '2' is '4' and the discrimination number of the block with the logical address '3' is '1'.

Figure 16B:
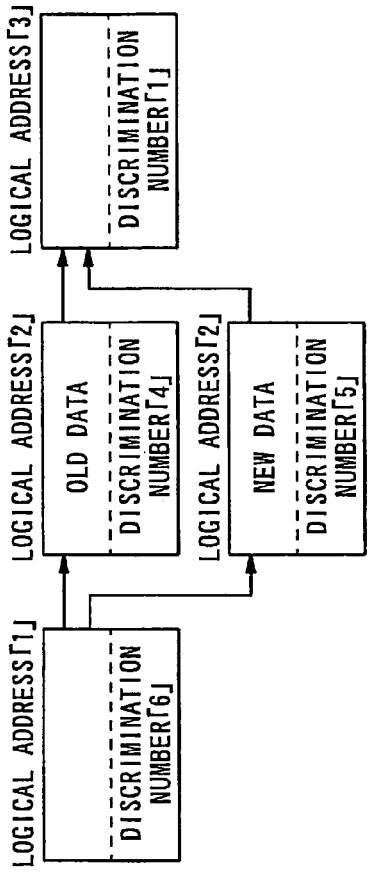

It is furthermore assumed that, in such state, the data of the block of the logical address '2' is rewritten. In such case, the logical address '2' is accorded to another vacant block and new data is written to this block, as shown in FIG. 16B, For the discrimination number of the block, in which to write new data, a value '5', corresponding to the discrimination number of the block, in which to write new data, and which is incremented by one, is set.

In this stage, there exist two blocks having the same logical address. The data stored in one of these two blocks bearing a larger discrimination number is new data, and the data stored in the other block bearing a smaller discrimination number is old data.

Figure 16C:
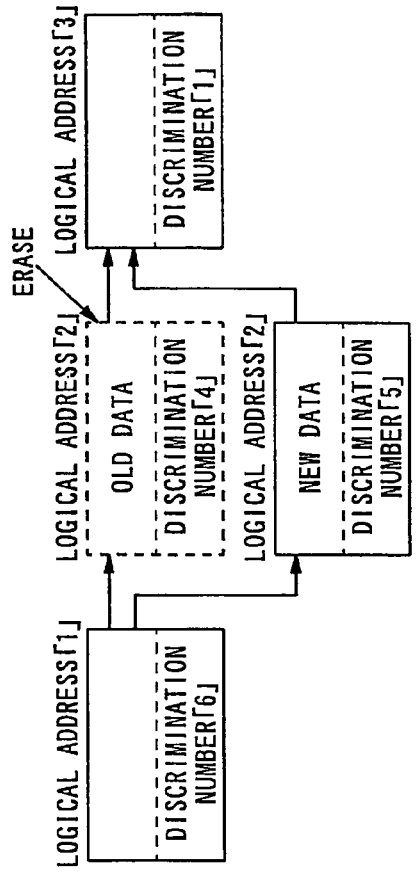

When the writing of new data has regularly come to a close, the block with the old data written therein is erased, as shown in FIG. 16C. It is noted that simply the block flag of the block in question is set to 'not as yet erased', without erasing the block with the old data written therein, with the block being erased later at a suitable timing.

Figure 17:
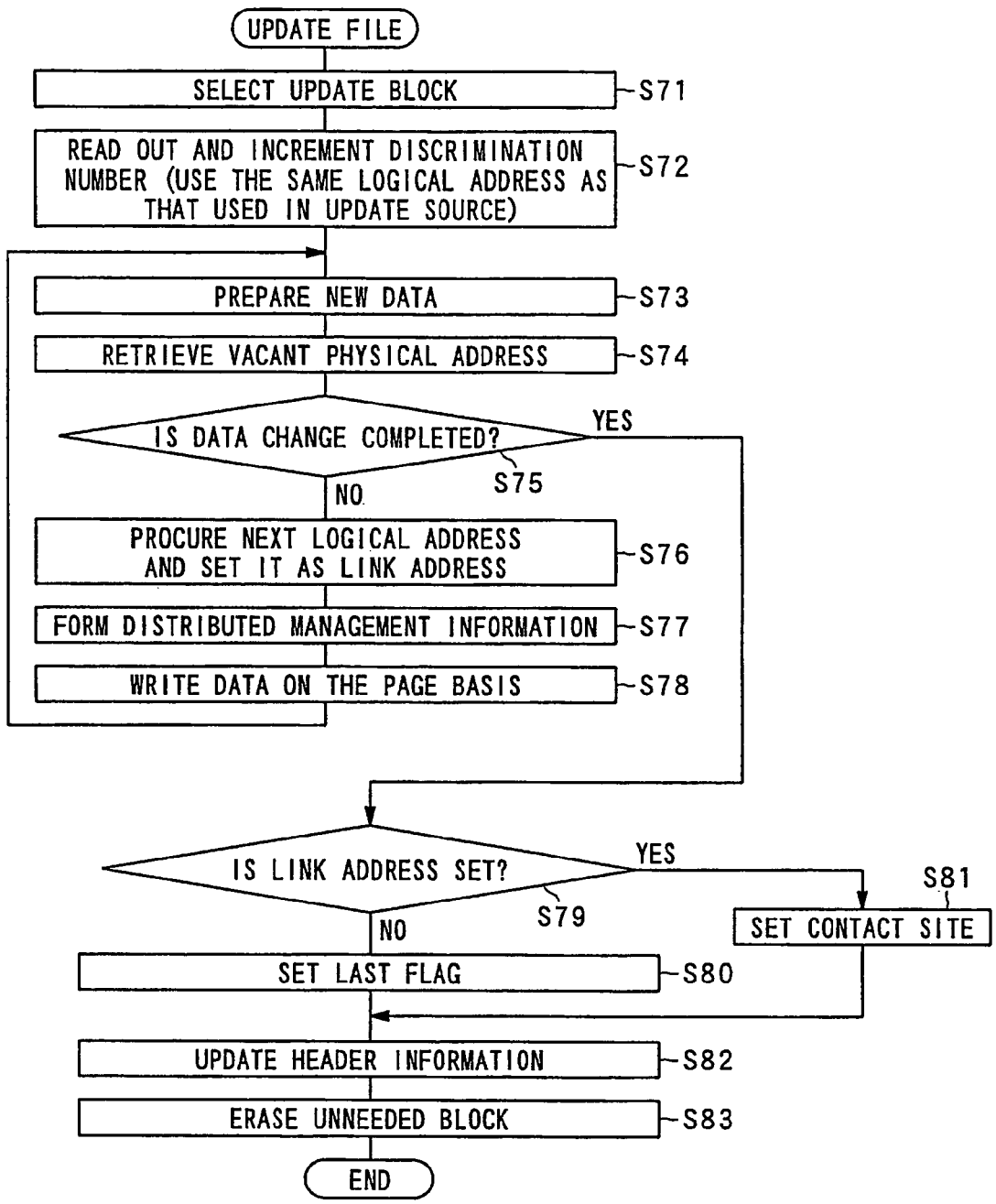
FIG. 17 depicts a flowchart showing the sequence of operations of the file update processing.

Referring now to the flowchart of FIG. 17, the above-described sequence of operations is now explained in detail.

In updating a file, the data processing apparatus 1 in a step S71 selects a block to be updated, before proceeding to the next block S72.

In this step S72, the data processing apparatus 1 reads out the discrimination number of the block to be updated, and sets a value corresponding to this discrimination number, incremented by one, as the discrimination number of the block in which to write new data. The data processing apparatus 1 also sets a value equal to the logical address of the block being updated, as a logical address of the block in which to write new data, before proceeding to the next step S73.

In this step S73, the data processing apparatus 1 provides new data to be written in the block, before proceeding to the next step S74.

In this step S74, the data processing apparatus 1 retrieves a vacant physical address, before proceeding to the next step S75.

In this step S75, the data processing apparatus 1 verifies whether or not data changes have all been completed. If the data changes have not been completed, processing transfers to a step S76 and, if otherwise, processing transfers to a step S79.

In the step S76, the data processing apparatus 1 procures the logical address of the next following block and sets this logical address as the link address, before proceeding to the next step S77.

In the step S77, the data processing apparatus 1 formulates the distributed management information pertinent to a block in which to write new data, based on e.g. the information asset in the steps up to the current step, before proceeding to the next step S78.

In this step S78, the data processing apparatus 1 sequentially writes new data, on the page basis, in the block of the physical address retrieved in the step S74. If the file may not be accommodated in the block being processed, one-block data is written on the page basis. If the file may be accommodated in the block being processed, only needed pages of the data are written on the page basis. Meanwhile, it is data of a new file and the distributed management information formed in the step S77 that are written in the block. After this step S78, processing reverts to the step S73 to repeat the processing.

In the step S79, the data processing apparatus 1 checks to see whether or not a link address has been set for the block which was being updated last, If the link address has not been set, the data processing apparatus 1 proceeds to a step S80 and, if the link address has been set, the data processing apparatus 1 proceeds to a step S81.

In the step S80, the data processing apparatus 1 sets the last flag of the block, in which new data was written last, to 'block last', before proceeding to the next step S82.

In the step S81, the data processing apparatus 1 sets the value of the link address, as set in the block which was being updated last, in the link address of the block in which new data was written last. The data processing apparatus 1 then proceeds to a step S82.

In this step S82, since there is a possibility that the file size has been changed, due to the file updating, a header including the information on the new file size is newly created to update the file header. The data processing apparatus 1 then proceeds to a step S83.

In this step S83, the data processing apparatus 1 erases the block where old data were written. It is noted that simply the block flag of the block in question is set to 'not as yet erased', without erasing the block with the old data written therein, with the block being erased later at a suitable timing.

The foregoing completes the file update processing.

12. Error Detection and Correction Processing

If, in the above-described system, the power supply is suddenly turned off, or the memory card 2 has forcibly been taken out from the data processing apparatus 1, when a new file is being written in the memory card 2 or a file stored in the memory card 2 is being updated, it is likely that plural blocks having the same logical address co-exist (logical address error) or there is no block specified by the link address (link address error).

Thus, in the system according to the present invention, error detection and correction processing for detecting and correcting the logical address error or the link address error is carried out in constructing the aggregate management information. This error detection and correction processing is hereinafter explained.

12-1 Error Detection Table

In the system according to the present invention, the logical address errors or the link address errors are detected in constructing the aggregate management information. As the table used for detecting the link address errors, an error detection table is used. The error detection table is used only for detecting the link address errors, and is transiently procured in the internal memory 4 of the data processing apparatus 1. The area procured for the error detection table is freed after the end of the error detection and correction processing.

Referring to FIG. 18, the error detection table is a table having a 1-bit area indicating the link state of the respective blocks. Stated differently, the error detection table is a one-bit-for-one-entry table, with each entry representing the link state of the logical addresses by '0' or '1'. If there are N blocks being processed, this error detection table takes up an area of N/8 bytes, With this error detection table, the values showing the link states of the respective blocks when the aggregate management information is being constructed have different meanings from those when the construction of the aggregate management information has come to a close.

If, when the aggregate management information is being constructed, the value indicating the coupling state is 'O', it indicates that the entry is in a normal state or indicates that the logical address corresponding to the entry is not specified by the link address of another block up to the block being processed. In this case, the value indicating the coupling state may become '1' as the processing proceeds, such that it is indefinite whether or not there persists a link error.

If, when the aggregate management information is being constructed, the value indicating the coupling state is '1', it indicates that the logical address corresponding to the entry is specified by the link address of another block up to the block being processed, but does not correspond to the physical address. In such state, the value indicating the coupling state may become '0' as the processing proceeds, such that it is indefinite whether or not there persists a link error.

If, on the other hand, the value indicating the link state is '1' in the stage where the construction of the aggregate management information has come to a close, such state indicates that, even though the logical address corresponding to the entry is specified as the link address, there lacks the corresponding physical address. Thus, this state indicates a link address error.

If the value indicating the link state is '0' in the stage where the construction of the aggregate management information has come to a close, such state indicates that the link pertinent to the logical address corresponding to the enw is in the normal state.

12-2 Detection of Link Address Error

A specified example of detection of the link address error, carried out using the above-described error detection table, is hereinafter explained.

For example, it is assumed that, with a block having a physical address '10', the logical address is 'I' and the link address is '3' and, with a block having a physical address '17' the logical address is '3' and the link address is '2'. also assumed that there is no block with the logical address '2'.

If the processing of reconstructing the aggregate management information is carried out at this time, link address error detection is carried out with the reconstruction of the aggregate management information, as shown in FIG. 20.

It is assumed that, in the initial stage, the values of the error detection table for the logical addresses of '1', '2' and '3' are all the initial value 'O', as shown in FIG. 20A, the conversion table of the aggregate management information is all of the initial value 'Oxffff', and that there is no value entered in the link table of the aggregate management information.

The information of the block with the logical address '1' then is read. The value of the conversion table, corresponding to the logical address 'I', is the value of the physical address of the block of the logical address '1', that is, '10'. The value of the link table for the logical address '1' is the value of the link address of the block of the logical address 'I', that is, '3'.

The entry of the logical address '3', specified by the value of the link table, corresponding to the logical address '1', is confirmed. Since no physical block is allocated to the entry of the logical address '3" the value of the error correction table, corresponding to the logical address '3', is set to '1' as shown in FIG. 20C. The value of the conversion table corresponding to the logical address '3' is the value of the logical address of the source of linkage, that is, '1'.

The information of the block of the logical address '3' with the value of the error detection table of '1' is read. The block with the logical address '3' is present and the information thereof can be read as regularly. Hence, the value of the error detection table, corresponding to the logical address '3', is '0') as shown in FIG. 20D. The value of the conversion table, corresponding to the logical address '3', is the value of the physical address of the block with the logical address '3', that is, '17'. The value of the link table, corresponding to the logical address '3' y the value of the link address of the block with the logical address '3'; that is, '2'.

The entry of the logical address '2', indicated by the value of the link table, corresponding to the logical address '3', is then confirmed. Since no physical block is allocated to the entry of the logical address '2', the value of the error detection table, corresponding to the logical address '2', is '1', as shown in FIG. 2OE. The value of the conversion table, corresponding to the logical address '2', is the value of the logical address of the linkage source, that is, '3'.

It is then attempted to read in the information of the block of the logical address '2' with the value of the error detection table of '1'. However, since there is no block with the logical address of '2', it becomes apparent at this stage that a link address error has occurred.

12-3 Error Correction Processing

In the system of the present invention, the error correction processing for the logical address error is carried out as follows:

Should the logical address error have been produced, the blocks having the same logical address are checked. In case there is only one complete block, the complete block is kept, and the remaining blocks are invalidated.

In case there are plural complete blocks with the same logical address (except the boot block), the discrimination numbers are compared to one another and the block with the smaller discrimination number is kept. Meanwhile, in case the discrimination number of one of the blocks is '255', with the discrimination number of another being '0', the block with the discrimination number of '255' is exploited.

It is noted that, if there are plural blocks, having the same logical address, the difference of the discrimination numbers thereof is usually 1. In case this condition does not hold, the manual restoration mode is set, instead of the system side carrying out automatic error correction processing.

If, in the system of the present invention, the link address error has occurred, any suitable error correction processing is carried out in agreement with the application software employing the memory card 2 or with data stored in the memory card 2. Specifically, the error correction processing, recited below, as an example, is desirably carried out.

That is, 2 new block is allocated as 2 block indicated by the last b J c address. Data read-in is continued up to a page the data of the last page of which can be read correctly, and data up to the page is copied in a new block. The last flag of the new block is set to 'block last'. This error correction is particularly desirable in case the target data is such data which is meaningful even partway, such as music data.

12-4 Construction of Aggregate Management Information and Error Correction Processing.

It is when some malfunction has occurred during data update processing that physical address errors or link address errors are produced in the system according to the present invention. In the present system, the aggregate management information, stored in the memory card 2, is invalidated prior to the data update processing, as described above. Thus, when physical address errors or link address errors are produced, the aggregate management information is invalid. In case the aggregate management information is invalid, the processing of re-checking the distributed management information of the totality of the blocks to reconstruct the aggregate management information is necessarily carried out in booting the memory card 2 next time.

Thus, in the present system, attention is directed to the fact that, in reconstructing the aggregate management information, the totality of the blocks are re-checked, and the error detection and correction processing is carried out at this time simultaneously. Stated differently, there is no probability of the physical address errors or link address errors being produced when the aggregate management information is valid, so that no error detection and correction processing is carried out at this time. That is, with this method, the error detection and correction processing is carried out only when reconstructing the aggregate management information. By so doing, it is unnecessary to access the memory card 2 redundantly for error detection and correction, so that the memory card 2 can be booted promptly.

This error detection and correction processing is carried out by the following sequence of operations:

(1) The conversion table on the intern memory 4 of the data processing apparatus 1 is initialized in its entirety to 'Oxffff'. An area of the error detection table is procured on the internal memory 4 and the error detection table in its entirety is initialized to '0'.

(2) Processing transfers to the leading end of the block.

(3) The distributed management information is read-in from the block, and the bit map table is constructed, using the distributed management information. If the 'possible/not possible flag' indicates 'unusable' or if the block flag is 'not as yet used' or 'not as yet erased', processing transfers to the next block to repeat the processing when the formulation of the bit map table has come to a close.

(4) The logical address of the block, referred to below as logical address A, and the link address thereof, referred to below as logical address B, are checked.

(5) If the logical address A is '0xffff, processing transfers to the next block and reverts to (3) to repeat the processing.

(6) The column of the logical address A of the error detection table is checked. If the column of the logical address A of the error correction table is '1', it is rewritten to '0', and the physical address of the block of the logical address A is written in the column of the logical address A of the error correction table. If the column of the logical address A of the error correction table is '0', the column of the logical address A of the conversion table is checked. If the value of the logical address A of the conversion table is '0xffff', the physical address of the block of the logical address A is written therein.

If a value other than '0xffff' has already been entered as the value of the logical address A of the conversion table, it indicates that the logical address error has occurred, so that error correction processing is carried out on the logical address error.

(7) The value of the logical address B is entered in the column of the logical address A of the link table.

(8) It is checked whether the last flag is the 'block last'. If the last flag is the 'block last', the link address is invalid. Thus, processing transfers to the next block and reverts to (3) to repeat the processing.

(9) Then, using the conversion table, it is checked whether or not the physical address corresponds to the logical address B. In case the value of the logical address B of the conversion table is different from '0xffff', the physical address corresponds to the logical address B. If conversely the value of the logical address B of the conversion table is '0xffff', the physical address does not correspond to the logical address B in the stages up to the current stage. In this case, '1' is written in the column of the logical address B of the error correction table, at the same time that the value of the logical address A is entered in the column of the logical address B of the conversion table, Then, processing transfers to the next block to revert to (3) to repeat the processing.

Even though the value of the logical address B of the conversion table is '0xffff', it is not clear, in a stage where processing has progressed only to a mid part of the block, whether or not the physical address really corresponds to the logical address B. That is, the physical address really may not correspond to the logical address B, or a corresponding block may appear as the processing proceeds.

(10) After processing has been done on the totality of the blocks, reference is made to the error correction table. The physical address does not correspond to the logical address, the value of the error correction table of which is '1'. That is, a link address error has occurred. Since the logical address of the block of the source of linkage is stored in the conversion table, this logical address is used to specify the source block to carry out proper error correction processing. Meanwhile, following the error correction processing, the value of the error correction table is set to '0', and the corresponding value of the conversion table is set to '0xffff'.

In constructing the aggregate management information, in the system according to the present invention, the error detection and correction processing is carried out, as described above. A specified method for constructing the aggregate management information and the error detection and correction processing is now explained in more detail by referring to the flowcharts of FIGS. 21 to 23.

Here, I, A, B, C, D and T(I) are used as variables, and N is used as a constant. The variable I is a variable into which is entered a physical address, the variable A is a variable into which is entered a logical address, the variable B is a variable into which is entered a link address, the variables C, D are variables into which are entered the values of the discrimination numbers, and the variable TO is a variable indicating the value of the error detection table corresponding to the logical address 'I': The constant N is a constant indicating the total number of blocks.

Figure 21:
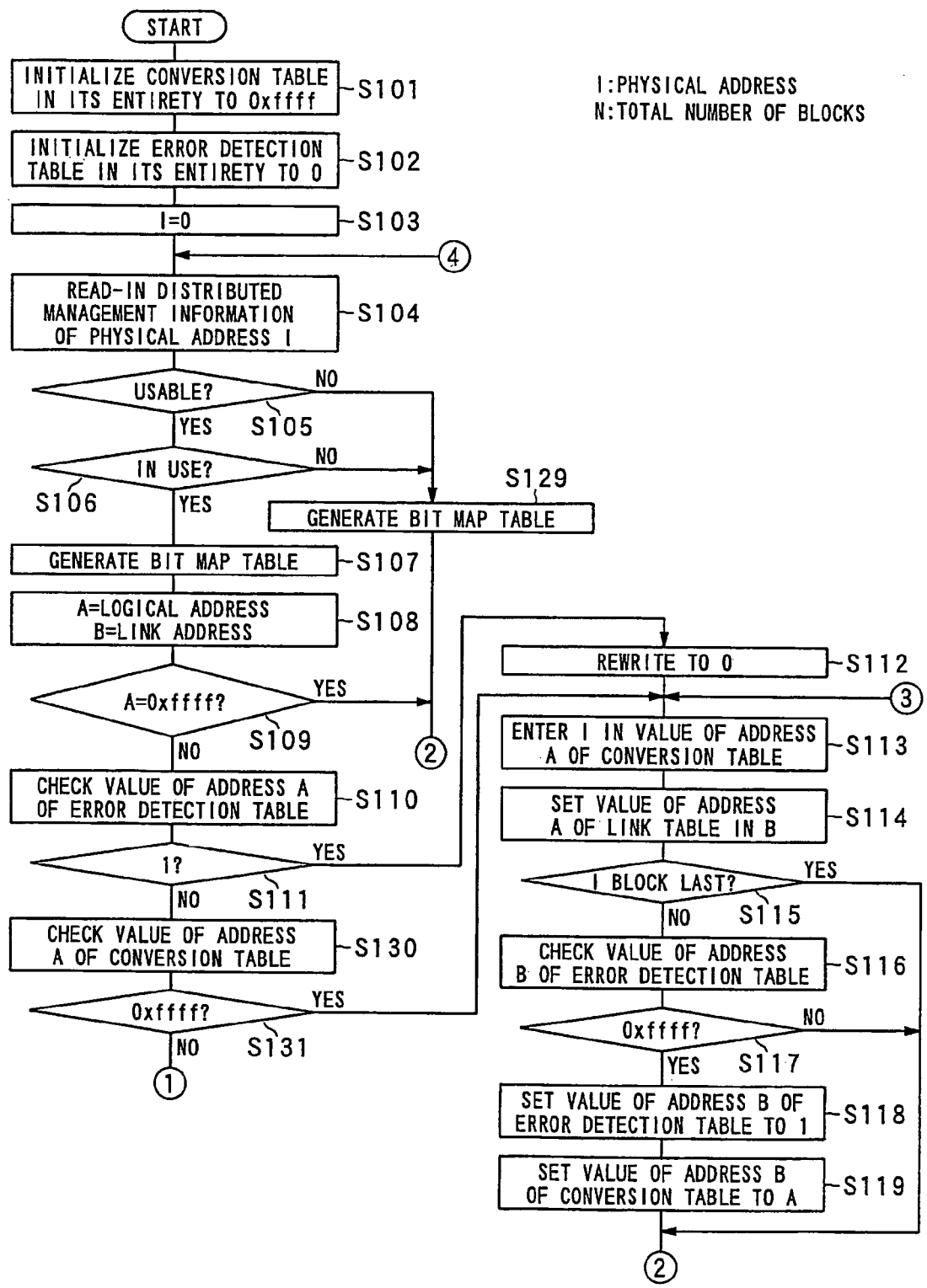
FIG. 21 is a flowchart showing the construction of the aggregate management information and the processing of the error detection and correction.

In constructing the aggregate management information, the data processing apparatus 1 in a step S101 of FIG. 21 initializes the conversion table to set all values to '0xffff'. The data processing apparatus 1 then proceeds to a step S102.

In this step S102, the data processing apparatus 1 initializes the error detection table, and sets all values to '07, before proceeding to a step S103.

In the step S103, the data processing apparatus 1 substitutes '0' into the variable I, before proceeding to a step S104.

In the step S104, the data processing apparatus 1 reads in the distributed management information of the block of the physical address I' from the memory card 2, before proceeding to a step S105.

In the step S105, the data processing apparatus 1 refers to the possible/not possible flag of the distributed management information, as read in the step S104, to verify whether or not the block of the physical address 'I' is usable. If the block is usable, the data processing apparatus 1 proceeds to a step S106 and, if otherwise, the data processing apparatus 1 proceeds to a step S129.

In the step S106, the data processing apparatus 1 refers to the block flag of the distributed management information, as read in the step S104, to check whether or not the block of the physical address is in use. Specifically, it is checked whether the block flag is 'used at the leading end' or 'used'. If the block flag is 'used at the leading end' or 'used', and the block is in use, the data processing apparatus 1 proceeds to a step S107 and, if the block is not in use, the data processing apparatus 1 proceeds to a step S129.

In the step S107, the data processing apparatus 1 adds the information pertinent to the block of the physical address 'I' to the bit map table, before proceeding to a step S108.

In the step S108, the data processing apparatus 1 substitutes the logical address of the block of the physical address 'I' into the variable A, while substituting the link address of the block of the physical address 'I' into the variable B. The data processing apparatus 1 then proceeds to a step S109.

Figure 22:
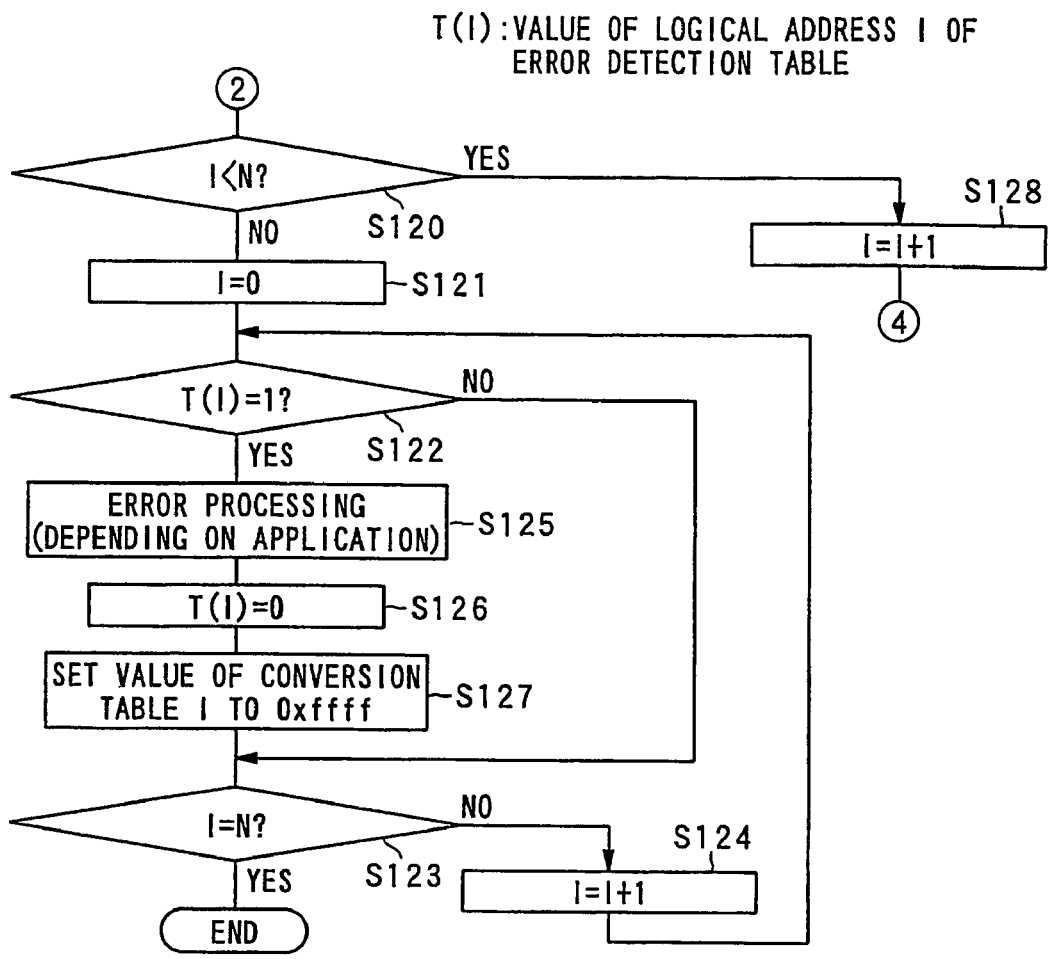
FIG. 22, continuing from FIG. 21, is a flowchart showing the construction of the aggregate management information and the processing of the error detection and correction.

In the step S109, the data processing apparatus 1 verifies whether or not the value of A is '0xffff', If the value of A is not '0xffff', the data processing apparatus 1 proceeds to a step S110 and, if it is '0xffff', the data processing apparatus 1 proceeds to a step S120 of FIG. 22.

In the step, S110, the data processing apparatus 1 checks the value of the logical address 'A' of the error detection table, before proceeding to a step S111.

In the step S111, the data processing apparatus 1 verifies whether or not the value of the logical address 'A' of the error detection table is '1'. If it is '1', the data processing apparatus 1 proceeds to a step S112 and, if otherwise, the data processing apparatus 1 proceeds to a step S130.

In the step S112, the data processing apparatus 1 rewrites the value of the logical address 'A' of the error detection table to 'O', before proceeding to a step S113.

In the step. S113, the data processing apparatus 1 writes the variable T (that is, the physical block 'I'), in a column of the logical address 'A' of the conversion table, before proceeding to a step S114.

In the step S114, the data processing apparatus 1 writes the variable 'B' (that is, the link block 'B'), in a column of the logical address 'A' of the link table, before proceeding to a step S115.

In the step S115, the data processing apparatus 1 verifies whether or not the last flag is the 'block last'. If the last flag is not the 'block last', the data processing apparatus 1 proceeds to a step S116 and, if otherwise, the data processing apparatus 1 proceeds to the step s120.

In the step S116, the data processing apparatus 1 checks for the value of the conversion table corresponding to the logical address 'B', before proceeding to a step S117.

In the step S117, the data processing apparatus 1 verifies whether the value of the conversion table corresponding to the logical address 'B' is 'Oxffff'. If it is 'Oxffff', the data processing apparatus proceeds to a step S118 and, if otherwise, the data processing apparatus proceeds to the step S120 of FIG. 22.

In the step S118, the data processing apparatus 1 rewrites the column of the logical address 'B' of the error correction table to '1', before proceeding to a step s119.

In the step S119, the data processing apparatus 1 writes the logical address 'A' in a column of the logical address 'B' of the error correction table, before proceeding to the step S120 of FIG. 2.

In the step S120 of FIG. 22, the data processing apparatus 1 compares the value of the variable I to the value of the constant N specifying the number of the total number of blocks. Except if 1<N, the data processing apparatus 1 proceeds to a step S121 and, if IcN, the data processing apparatus 1 proceeds to a step S128.

In the step S121, the data processing apparatus 1 substitutes '0' into the variable I, before proceeding to a step S122.

In the step S122, the data processing apparatus 1 verifies whether or not the variable TO, specifying the value of the logical address 'I' of the error correction table, is '1'. If it is not '1', the data processing apparatus 1 proceeds to a step S123 and, if it is '1', the data processing apparatus 1 proceeds to a step S125.

In the step S123, the data processing apparatus 1 compares the value of the variable I to the value of the constant N indicating the total number of blocks. If I=N, processing comes to a close. Except if I=N, processing transfers to a step S124.

In the step S124, the data processing apparatus 1 increments the value of the variable I by one. The data processing apparatus 1 then reverts to the step S122 to repeat the processing.

If, in the step S122, the variable T (I) is '1', the data processing apparatus 1 proceeds to the step 5125. It is when the link address error has occurred that the data processing apparatus 1 proceeds to the step 3125. Thus, in this step S125, the data processing apparatus 1 perform preset error correction processing for link address errors. Here, the data processing apparatus performs proper error correction processing depending on e.g. data stored in the memory card 2 or the application software employing the memory card 2. On completion, the error correction processing, the data processing apparatus proceeds to a step S126.

In the step S126, the data processing apparatus 1 sets the value of the logical address of the error detection table to 'O', before proceeding to a step S127.

In the step S127, the data processing apparatus 1 rewrites the column of the logical address 'I' of the conversion table to 'Oxffff'. The data processing apparatus 1 then proceeds to the step S123 to perform the above processing.

If I<N in the step S120, the data processing apparatus proceeds to the step S128, as described above. It is when the readout of the distributed management information for the totality of the blocks has not come to a close that the data processing apparatus proceeds to the step S128. In this step $128, the data processing apparatus 1 increments the value of the variable I by 1 and then reverts to the step S104 of FIG. 21 to repeat the processing.

If the block of the physical address 'I' is unusable in the step S105 of FIG. 21, or if the block of the physical address 'I' is not in use in the step S106, the data processing apparatus proceeds to the step S129, as described above.

In the step S129, the data processing apparatus 1 adds the information pertinent to the block of the physical address 'I' to the bit map table. The data processing apparatus then proceeds to the step S120 of FIG. 22 to carry out the above processing.

If, in the step S111 of FIG. 21, the value of the logical address 'A' of the error correction table was not '1', the data processing apparatus proceeds to the step S130, as described above. In this step S130, the data processing apparatus checks for the value of the logical address 'A' of the conversion table, before proceeding to a step S131.

In this step S131, the data processing apparatus 1 checks to see if the value of the logical address 'A' of the conversion table is 'Oxffff'. If it is 'Oxffff', the data processing apparatus 1 proceeds to a step S113 to carry out the above processing and, if otherwise, the data processing apparatus 1 proceeds to a step S132 of FIG. 23.

Figure 23:
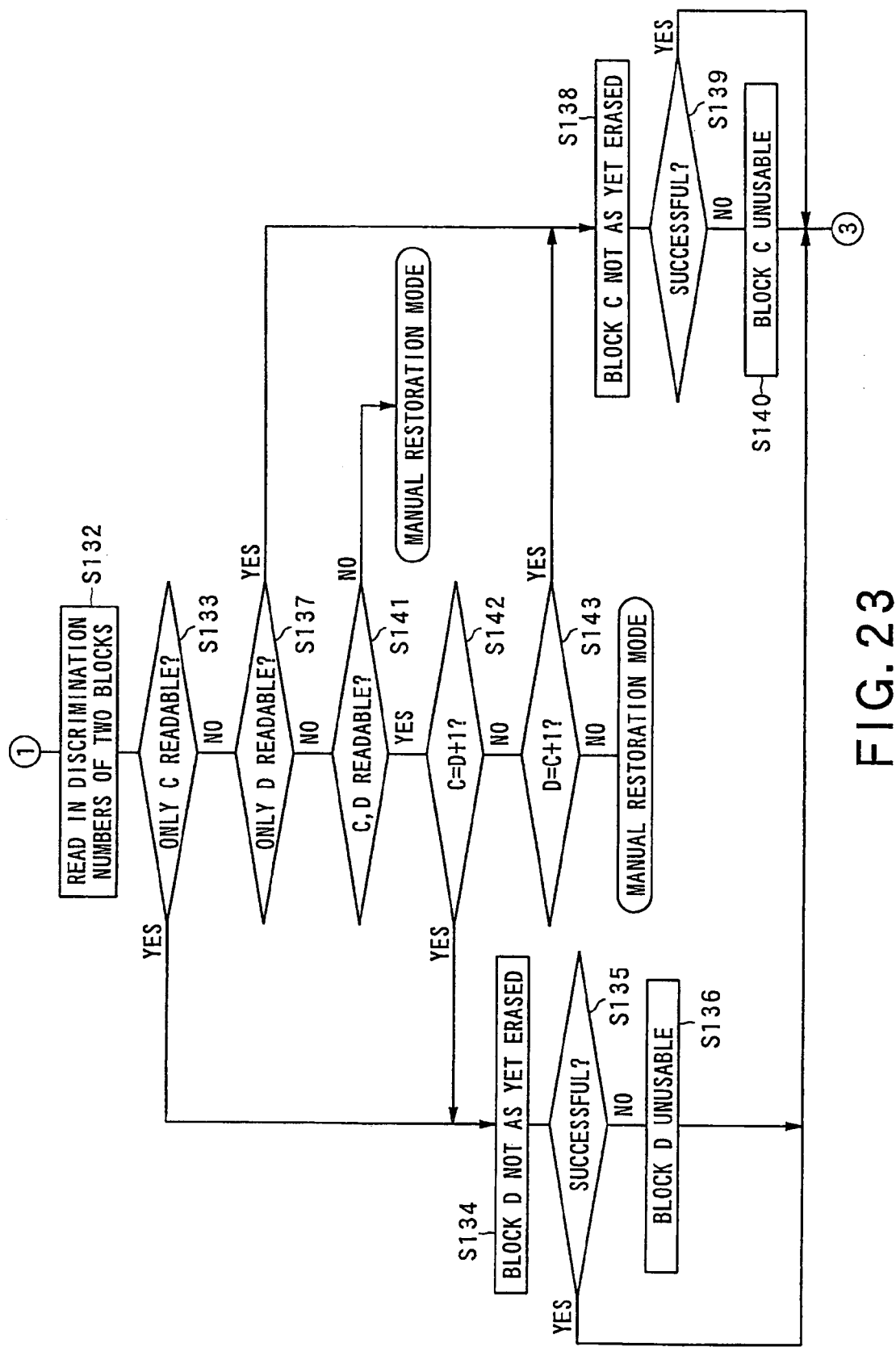
FIG. 23, continuing from FIG. 22, is a flowchart showing the construction of the aggregate management information and the processing of the error detection and correction.

It is when the logical address error is produced, such that there exist two blocks having the logical address 'A', that the data processing apparatus 1 proceeds to the step S132 of FIG. 23. Thus, in the step S132, the data processing apparatus 1 reads out the discrimination numbers of two blocks having the logical address 'A'. If the data processing apparatus 1 has read out the discrimination number of one of the blocks, the value is substituted into the variable C. If the data processing apparatus 1 has read out the discrimination number of the other block, the value is substituted into the variable D. The data processing apparatus 1 then proceeds to a step S133.

In the step S133, the data processing apparatus 1 verifies whether or not the discrimination number has been read out in the step S132 as regularly. If only the discrimination number substituted into the variable C has been read out, the data processing apparatus proceeds to a step S134 and, if otherwise, the data processing apparatus proceeds to a step S137.

In the step S134, the data processing apparatus 1 sets the block flag of the block, corresponding to the variable D, to 'not as yet erased', before proceeding to a step S135.

In the step S135, the data processing apparatus 1 checks to see if the processing of the step S134, that is, the processing of setting fbe block flag of the block, corresponding to the variable 9, to 'not as yet erased', has met with success. If the processing has met with success, the data processing apparatus reverts to the step S113 of FIG. 21 to carry out the above processing. If the processing has not met with success, the data processing apparatus proceeds to a step S136.

In the step S136, the data processing apparatus 1 sets the 'possible/not possible flag' of the block, corresponding to the variable D, to 'unusable'. The data processing apparatus 1 then reverts to the step S113 of FIG. 21 to carry out the above processing.

In the step S137, the data processing apparatus 1 verifies if the readout of the discrimination number in the step S132 has been carried out as regularly. If only the discrimination number, substituted into the variable D, has been read out, processing transfers to a step S138 and, if otherwise, processing transfers to a step S141.

In the step S138, the data processing apparatus 1 sets the block flag of the block corresponding to the variable C to 'not as yet erased', before proceeding to a step S139.

In the step S139, the data processing apparatus 1 checks to see if the processing of the step 8138, that is, the processing of setting the block flag of the block, corresponding to the variable C, to 'not as yet erased', has met with success. If the processing has met with success, the data processing apparatus reverts to the step S113 of FIG. 21 to carry out the above processing. If the processing has not met with success, the data processing apparatus proceeds to a step S140.

In the step S140, the data processing apparatus 1 sets the 'possible/not possible flag' of the block, corresponding to the variable C, to 'unusable'. The data processing apparatus 1 then reverts to the step S113 of FIG. 21 to carry out the above processing.

In the step S141, the data processing apparatus 1 verifies if the readout of the discrimination number in the step S132 has been carried out as regularly. In case both the discrimination number substituted into the variable C and the discrimination number substituted into the variable D have been read out as regularly, processing transfers to a step 5142. In case both were not readable, processing transfers to a manual restoration mode for carrying out suitable manual processing necessary for error correction.

In the step S142, the data processing apparatus 1 compares the value of the variable C to a value corresponding to the value of the variable D plus 1. If these values are equal, the data processing apparatus 1 proceeds to the step S134 to carry out the above processing and, if otherwise, processing transfers to a manual restoration mode for carrying out suitable manual processing necessary for error correction.

With the above processing, the error detection and correction processing is carried out simultaneously with reconstruction of the aggregate management information, so that it is unnecessary to access the memory card 2 wastefully for carrying out the error detection and correction processing. That is, with the system of the present invention, no error detection and correction processing is carried out in case the data write operation has come to a close as regularly and the effective aggregate management information has been written back to the memory card 2.

Thus, with the system of the present invention, no unneeded error detection/correction is carried out, thus raising the access efficiency to the memory card 2. In particular, since the error detection and correction processing is carried out simultaneously with the operation of constructing the aggregate management information from the distributed management information, the accessing to the memory card 2 may be minimized.

In addition, with the system of the present invention, the discrimination number is accorded to each block of the memory card 2 and is used in order to deal with the logical address error, so that data update processing may be carried out in safety. That is, even supposing that some error is produced during data update processing, such that there exist plural blocks having the same logical address, data prior to the update processing may be restored by employing the discrimination number. Furthermore, with the system of the present invention, the Link address error may be detected by employing the error detection table, while the block having no destination of linkage may also be detected.

What is claimed is:

1. A data management apparatus for supervising a non-volatile memory having a plurality of blocks erasable in a lump, each of said blocks being formed by a plurality of pages, each of said pages including a redundant area, said apparatus comprising;

management means for storing distributed management information, as the management information for the respective blocks, in said redundant area of each page, and for storing aggregate management information in said non-volatile memory, in association with said distributed management information, said aggregate management information supervising data stored in said non-volatile memory in a lump, said management means verifying, at the time of booting, whether said aggregate management information is valid based on a block flag of a block having a file of said aggregate management information stored therein, said block flag being set depending upon whether said aggregate management information has been updated to match all modification of the data contents of said non-volatile memory, said management means supervising said data based on said aggregate management information when said aggregate management information is valid, said management means supervising said data based and on said distributed management information when said aggregate management information is not valid, wherein, if a part of said aggregate management information is changed by writing new data in a data storage area of said non-volatile memory, said management means updates the aggregate management information, based on the distributed management information of the newly written data, and writes the updated aggregate management information in said non-volatile memory; and error correction means arranged to carry out an error detection and correction on said distributed management information using error correction code stored within said pages when said management means determines, at the time of booting, said aggregate management information to be not valid, simultaneously with said management means constructing said aggregate management information from said distributed management information, and to not carry out said error detection and correction when said management means determines, at the time of booting, said aggregate management information to be valid, wherein, the error correction means determines a logic of an entry of an error correction table when carrying out error detection and correction, when it is determined that a link address error has occurred wherein the link address error comprises a first physical address which does not correspond to a first logical address.

2. The data management apparatus according to claim 1 wherein, if performing preset data processing, said management means writes the updated aggregate management information in said nonvolatile memory after said preset data processing has come to a close.

3. The data management apparatus according to claim 1 wherein management flags for supervising the storage state of the data of said blocks are stored, as said distributed management information, and wherein the management flags of the respective blocks are collected and stored as said aggregate management information; said management means supervising the data storage state of said non-volatile memory based on said aggregate management information.

4. The data management apparatus according to claim 1 wherein management flags of the respective blocks are collected and stored as said aggregate management information; said management means converting the physical addresses and the logical address information of said blocks, based on said aggregate management information, to supervise data stored in said non-volatile memory.

5. The data management apparatus according to claim 1 wherein link information, as a logical address of a block linked to a given block, is stored, as said distributed management information, and wherein link addresses of the respective blocks are collected and stored as said aggregate management information.

6. A data management method for supervising a non-volatile memory having a plurality of blocks erasable in a lump, each of said blocks being formed by a plurality of pages, each of said pages including a redundant area, said method comprising:
storing distributed management information, as management information for the respective blocks, in said redundant area of each page;
storing aggregate management information in said non-volatile memory, in association with said distributed management information, said aggregate management information supervising data stored in said non-volatile memory in a lump;
verifying, at the time of booting, whether said aggregate management information is valid based on a block flag of a block having a file of said aggregate management information stored therein, said block flag being set depending upon whether said aggregate management information has been updated to match all modification of the data contents of said non-volatile memory;
supervising said data based on said aggregate management information when said aggregate management information is valid; and
supervising said data based on said distributed management information when said aggregate management information is not valid,
wherein, if a part of said aggregate management information is changed by writing new data in said data storage area, said aggregate management information is updated, based on the distributed management information of the newly written data, and the updated aggregate management information is stored; and
carrying out an error detection and correction on said distributed management information using error correction code stored within said pages when it is determined, at the time of booting, that said aggregate management information is not valid, simultaneously with constructing said aggregate management information from said distributed management information, and not carrying out said error detection and correction when it is determined, at the time of booting, that said aggregate management information is valid,
wherein, the carrying out of error detection and correction requires determining a logic of an entry of an error correction table, when it is determined that a link address error has occurred, wherein the link address error comprises a first physical address which does not correspond to a first logical address.

7. The data management method according to claim 6 wherein, if preset data processing is being performed, the updated aggregate management information is stored after said preset data processing has come to a close.

8. The data management method according to claim 6 wherein management flags for supervising the storage state of the data of said blocks are stored, as said distributed management information, and wherein the management flags of the respective blocks are collected and stored as said aggregate management information; and wherein
the data storage state of said data storage area is supervised based on said aggregate management information.

9. The data management method according to claim 6 wherein physical addresses of the respective blocks are collected and stored as said aggregate management information;
said physical addresses and the logical address information of said blocks are converted, based on said aggregate management information, to supervise stored data.

10. The data management method according to claim 6 wherein the link information, as a logical address of a block linked to a given block, is stored, as said distributed management information, wherein link addresses of the respective blocks are collected and stored as said aggregate management information; and wherein data stored are supervised based on said aggregate management information.

11. A non-volatile memory having a plurality of blocks erasable in a lump, each of said blocks being formed by a plurality of pages, each of said pages including a redundant area, wherein:
distributed management information, as the management information for the respective blocks, is stored in said redundant area of each page, aggregate management information supervising data stored in each block in a lump, is stored in association with said distributed management information, and it is verified, at the time of booting, whether said aggregate management information is valid based on a block flag of a block having a file of said aggregate management information stored therein, said block flag being set depending upon whether said aggregate management information has been updated to match all modification of the data contents of said non-volatile memory, said data is supervised based on said aggregate management information when said aggregate management information is valid, and wherein said data is supervised based on said distributed management information when said aggregate management information is not valid; and
error correction code, stored within said pages, wherein error detection and correction is carried out on said distributed management information using said error correction code when it is determined, at the time of booting, that said aggregate management information is not valid, simultaneously with constructing said aggregate management information from said distributed management information, and wherein error detection and correction is not carried out on said distributed management information using said error correction code when it is determined, at the time of booting, that said aggregate management information is valid,
wherein, if a part of said aggregate management information is changed by writing new data in a data storage area of said non-volatile memory, said management means the aggregate management information based on the distributed management information of the newly written data, and writes the updated aggregate management information in said non-volatile memory, and
wherein, the error correction code determines a logic of an entry of an error correction table when carrying out error detection and correction, when it is determined that a link address error has occurred, wherein the link address error comprises a first physical address which does not correspond to a first logical address.

12. The non-volatile memory according to claim 11 wherein management flags for supervising the storage state of the data of said blocks are stored, as said distributed management information, and wherein the management flags of the respective blocks are collected and stored as said aggregate management information.

13. The non-volatile memory according to claim 11 wherein physical addresses of the respective blocks are collected and stored as said aggregate management information.

14. The non-volatile memory according to claim 11 wherein the link information, as a logical address of a block linked to a given block, is stored, as said distributed management information, and wherein link addresses of the respective blocks are collected and stored as said aggregate management information.

15. A storage device including a non-volatile memory having a plurality of blocks erasable in a lump, each of said blocks being formed by a plurality of pages, each of said pages including a redundant area, wherein distributed management information, as the management information for the respective blocks, is stored in said redundant area of each page, with aggregate management information supervising data stored in each block, in a lump, in association with said distributed management information, wherein it is verified, at the time of booting, whether said aggregate management information is valid based on a block flag of a block having a file of said aggregate management information stored therein, said block flag being set depending upon whether said aggregate management information has been updated to match all modification of the data contents of said non-volatile memory, wherein said data is supervised based on said aggregate management information when said aggregate management information is valid, and said data is supervised based on said distributed management information when said aggregate management information is not valid, and wherein error correction code is stored within said pages, wherein error detection and correction is carried out on said distributed management information using said error correction code when it is determined, at the time of booting, that said aggregate management information is not valid, simultaneously with constructing said aggregate management information from said distributed management information, and wherein error detection and correction is not carried out on said distributed management information using said error correction code when it is determined, at the time of booting, that said aggregate management information is valid wherein, if a part of said aggregate management information is changed by writing new data in a data area said non-volatile memory, said management means updates the aggregate management information, based on the distributed management information of the newly written data, and writes the updated aggregate management information in said non-volatile memory and wherein, the error correction code determines a logic of an entry of an error correction table when carrying out error detection and correction, when it is determined that a link address error has occurred, wherein the link address error corn rises a first physical address which does not correspond to a first logical address.

16. The storage device including the non-volatile memory according to claim 15 wherein management flags for supervising the storage state of the data of said blocks are stored, as said distributed management information, and wherein the management flags of the respective blocks are collected and stored as said aggregate management information.

17. The storage device including the non-volatile memory according to claim 15 wherein management flags of the respective blocks are collected and stored as said aggregate management information.

18. The storage device including the non-volatile memory according to claim 15 wherein the link information, as a logical address of a block linked to a given block, is stored, as said distributed management information, and wherein link addresses of the respective blocks are collected and stored as said aggregate management information.

19. A data processing system comprising an external storage device including a non-volatile memory having a plurality of blocks erasable in a lump, each of said blocks being formed by a plurality of pages, each including a redundant area, and a data management device for supervising said external storage device, wherein said data management device includes management means for storing the distributed management information, as the management information for the respective blocks, in said redundant area of each page, and for storing the aggregate management information in said non-volatile memory, in association with said distributed management information, said aggregate management information supervising data stored in said non-volatile memory in a lump, said management means verifying, at the time of booting, whether said aggregate management information is valid based on a block flag of a block having a file of said aggregate management information stored therein, said block flag being set depending upon whether said aggregate management information has been updated to match all modification of the data contents of said non-volatile memory, said management means supervising said data based on said aggregate management information when said aggregate management information is valid, said management means supervising said data based on said distributed management information when said aggregate management information is not valid, wherein, if a part of said aggregate management information is changed by writing new data in a data storage area of said non-volatile memory, said management means updates the aggregate management information, based on the distributed management information of the newly written data, and writes the updated aggregate management information in said non-volatile memory; and error correction means arranged to carry out an error detection and correction on said distributed management information using error collection code stored within said pages when said management means determines, at the time of booting, said aggregate management information to be not valid, simultaneously with said management means constructing said aggregate management information from said distributed management information, and to not carry out said error detection and correction when said management means determines, at the time of booting, said aggregate management information to be valid, wherein, the error correction means determines a logic of an entry of an error correction table when carrying out error detection and correction, when it is determined that a link address error has occurred, wherein the link address error comprises a first physical address which does not correspond to a first logical address.

20. The data processing system according to claim 19 wherein, if performing preset data processing, said management means writes the updated aggregate management information in said non-volatile memory after said preset data processing has come to a close.

21. The data processing system according to claim 19 wherein management flags for supervising the storage state of the data of said blocks are stored, as said distributed management information, and wherein the management flags of the respective blocks are collected and stored as said aggregate management information.

22. The data processing system according to claim 19 wherein physical addresses of the respective blocks are collected and stored as said aggregate management information;

said management means converting the physical addresses and the logical addresses of said blocks, based on said aggregate management information, to supervise data stored in said nonvolatile memory.

* * * * *